(12) United States Patent
Veerman et al.

(10) Patent No.: US 12,447,443 B2
(45) Date of Patent: Oct. 21, 2025

(54) STACK ASSEMBLY

(71) Applicant: Redstack B.V., Sneek (NL)

(72) Inventors: Joost Veerman, Sneek (NL); Rinze Bles, Sneek (NL); Albert Thaeke Russchen, Sneek (NL)

(73) Assignee: REDSTACK B.V., Sneek (NL)

( * ) Notice: Subject to any disclaimer, the term of this patent is extended or adjusted under 35 U.S.C. 154(b) by 820 days.

(21) Appl. No.: 17/256,483

(22) PCT Filed: Jul. 4, 2019

(86) PCT No.: PCT/NL2019/050419
§ 371 (c)(1),
(2) Date: Dec. 28, 2020

(87) PCT Pub. No.: WO2020/009580
PCT Pub. Date: Jan. 9, 2020

(65) Prior Publication Data
US 2021/0129082 A1   May 6, 2021

(30) Foreign Application Priority Data

Jul. 4, 2018  (NL) ...................................... 2021245

(51) Int. Cl.
*B01D 61/50*  (2006.01)
*B01D 63/08*  (2006.01)

(52) U.S. Cl.
CPC ......... *B01D 61/50* (2013.01); *B01D 63/0821* (2022.08); *B01D 63/0822* (2022.08);
(Continued)

(58) Field of Classification Search
CPC .. B01D 61/50; B01D 63/082; B01D 63/0822; B01D 2313/2031; B01D 2313/54; B01D 2313/04
See application file for complete search history.

(56) References Cited

U.S. PATENT DOCUMENTS 6,193,869 B1 * 2/2001 Towe ..................... B01D 61/52
  204/632
2012/0117789 A1  5/2012 Liang
(Continued)

*Primary Examiner* — Parviz Hassanzadeh
(74) *Attorney, Agent, or Firm* — MH2 Technology Law Group, LLP

(57) ABSTRACT

Stack assembly comprising a hollow external housing having a central axis, the external housing extending from a first end to a second end and enclosing a housing space, and a membrane stack comprising a plurality of membranes, wherein the membrane slack is positionable inside the external housing and a number of side plates extending substantially parallel to the central axis, wherein each side plate of the number of side plates is associated with a side of the membrane stack and extending along the associated side and a number of sealing connectors that extend substantially parallel to the central axis and adjacent with an inner surface of the external housing, wherein each sealing connector of the number of sealing connectors is configured to connect two side plates to each other, wherein the sealing connectors and the side plates cooperate to form an enclosing structure, and wherein, in use of the stack assembly, the enclosing structure encloses the membrane stack. The invention also relates to a method for assembling a stack assembly and a method for generating energy or performing an electrodialysis process.

16 Claims, 17 Drawing Sheets

(52) U.S. Cl.
CPC .. *B01D 2313/04* (2013.01); *B01D 2313/2011* (2022.08); *B01D 2313/2031* (2022.08); *B01D 2313/54* (2013.01)

(56) References Cited

U.S. PATENT DOCUMENTS

| | | |
|---|---|---|
| 2013/0017416 A1 | 1/2013 | Goeting et al. |
| 2016/0009573 A1 | 1/2016 | Liang |
| 2016/0346737 A1* | 12/2016 | Liang .................... B01D 17/06 |

* cited by examiner

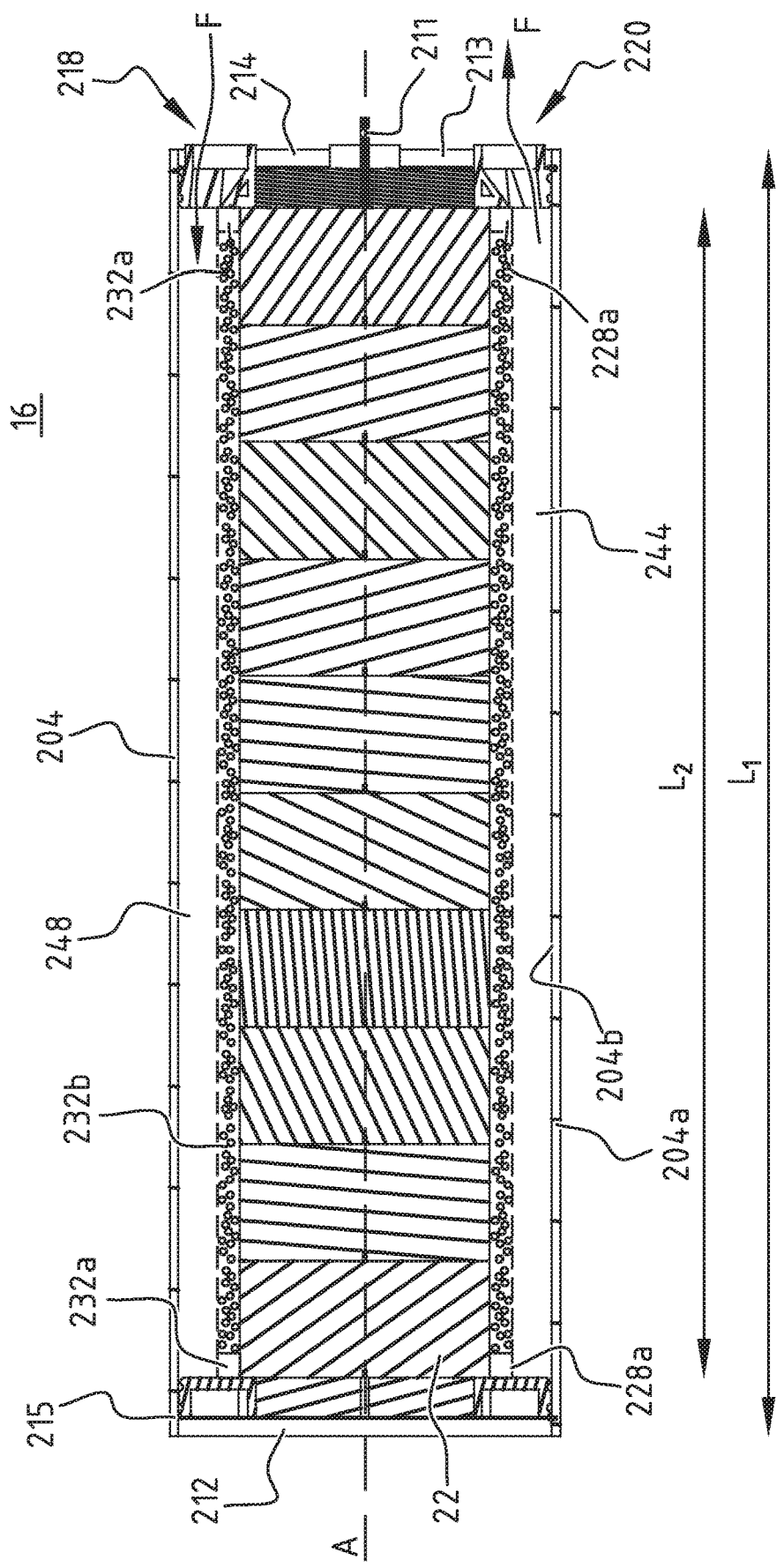

STACK ASSEMBLY

The invention relates to a stack assembly for (electro) membrane processes, method for assembling such stack assembly and a method for generating energy using such a stack assembly.

Stack assemblies for (electro)membrane processes are known from practice. To simplify manufacturing, some of the known stack assemblies comprise an external housing in which a membrane stack is placed, after which the membranes are fixedly connected to each other and the external housing.

A disadvantage of such known stack assemblies is that, once assembled, the membrane stack is not removable. As a result, any errors in the stack render the entire stack assembly useless.

The invention aims to remove or at least reduce this disadvantage by providing a removable membrane stack.

To that end, the invention comprises a stack assembly, the stack assembly comprising:
- a hollow external housing having a central axis, the external housing extending from a first end to a second end and enclosing a housing space;
- a membrane stack comprising a plurality of membranes, wherein the membrane stack is positionable inside the external housing;
- a number of side plates extending substantially parallel to the central axis, wherein each side plate of the number of side plates is associated with a side of the membrane stack and extending along the associated side;
- a number of sealing connectors that extend substantially parallel to the central axis and adjacent with an inner surface of the external housing, wherein each sealing connector of the number of sealing connectors is configured to connect two side plates to each other;
- wherein the sealing connectors and the side plates cooperate to form an enclosing structure, and wherein, in use of the stack assembly, the enclosing structure encloses the membrane stack.

It is noted that the term adjacent with respect to the sealing connectors also includes similar terms, most notably contiguous. Thus, the membrane stack according to the invention explicitly also includes embodiments in which a number of sealing connectors extends substantially parallel to the central axis and contiguous with and/or abut with an inner surface of the external housing.

An advantage of the stack assembly according to the invention is that the enclosing structure, formed by the side plates and the sealing connectors, allows the membrane stack to be removably placed in the external housing. As a result, the membrane stack can be assembled and enclosed in the enclosing structure before positioning the membrane stack and enclosing structure in the external housing. This simplifies construction of the membrane stack and also simplifies quality control of the membrane stack after assembly.

Another advantage is that the side plates can, in addition to holding the membrane stack, be used for guiding and dividing a flow of fluid to and/or from the membrane stack to achieve a more even distribution of fluid over the membrane cells in the membrane stack. Furthermore, the side plates can also be used to achieve a reduction of the ionic short-cut currents.

Yet another advantage is that the side plates in combination with the sealing connectors reduces fluid leakage between different sides of the membrane stack in the external housing. The sealing connectors preferably have at least a part that connects or is contiguous with the external wall and sealingly engages therewith. This sealing engagement prevents fluid from traveling in a circumferential direction along the inner wall of the external housing. In other words, the fluid, when entering near a first side of the membrane stack, is unable to travel to a different, adjacent side of the membrane stack without passing through the stack. This configuration is especially interesting for a cross-flow stack, in which the flows from adjacent sides of the membrane stack are preferably not mixed with each other.

A further advantage of the stack assembly according to the invention is that it allows a modular stack assembly. The side plates may be provided as a single side plate or as a number of adjacent and connected side plates. By doing so, any length of membrane stack can be accommodated. Naturally, it is also within the scope of the invention to provide modular building blocks that comprise an enclosing structure of a certain length enclosing a membrane stack of a similar length that is stacked with other, similar enclosing structures. This allows the stack assembly to be easily expanded to a larger stack assembly.

Yet another advantage of the stack assembly according to the invention is that no stack rods and/or (stack) tie rods are required to hold the membrane stack together, which results in a higher surface of the membranes in the membrane stack being effectively usable. In the stack assembly according to the invention, the membrane stack is insertable in the housing and is subsequently clampable or pressable together by using end plates that are connected to the external housing. This may for example be achieved using a clamping ring or ring-formed spring that is provided near or at an end of the external housing and that is configured to clamp the membrane stack. Another embodiment is to provide a flange at an outer end of the external housing, which flange is connected to an end plate. The end plate is pressed onto the membrane stack (thus providing clamping force) by bolting the end plate and the flange of the external housing together. Other options to provide such clamping are possible as well.

In an embodiment, the external housing is a pressure vessel, preferably a pressure vessel configured to withstand (absolute) pressure in the range of 0-25 bar, more preferably in the range of 1-12.5 bar.

The stack assembly according to the invention has the advantage that the external housing also forms a pressure vessel. The pressure vessel preferably withstands pressures up to 25 bar.

Due to the fact that the external housing also forms a pressure vessel, the use of a separate pressure vessel or construction to allow pressure build-up in the stack assembly is obviated. Thus, due to the reduced number of required components the cost of manufacturing a stack assembly according to the invention is reduced. Also, the external housing, especially when using an external housing having a circular or semi-circular cross-section, provides an uniform distribution of the pressure in the housing and/or is capable of withstanding greater pressures, which means a thickness of a side wall of the external housing can be reduced and/or greater pressures can be applied to the stack assembly.

Another advantage of the enclosing structure with sealing connectors and side plates is that the enclosing structure can be connected to the membrane stack in a variety of different ways. This for example includes a disconnectable connection, a fixed connection or a combination of fixed and disconnectable connections.

In a preferred elaboration, the sealing connectors are fixedly connected to the membrane stack, whereas the side plates are removably connected to the membrane stack. This provides the advantage that the side plates can be removed to replace them with side plates having a different configuration. This allows the stack assembly according to the invention to be used for a wide variety of applications by using a single membrane stack for different applications.

Another advantage of the fact that the external housing is a pressure vessel is that the external housing is used as part of the manifolds/flow compartments for feed and discharge of fluid flows. This provides a stack assembly with a simplified manufacturing and, especially, maintenance process, because removing the external housing immediately grants access to the manifolds/flow compartments. This is not possible in known stack assemblies, in which the manifolds/flow compartments are provided in a separate frame, which needs to be accessed after removing it from the external housing.

It should be noted that the housing is preferably an elongated hollow housing that extends around the central axis. The hollow external housing as well as the membrane stack may be provided in a variety of shapes, such as circular, oval, rectangular, hexagonal or any other shape that is suitable for forming a housing having a housing space. Preferably, a circular or semi-circular shape is used. The housing space preferably comprises an inner space that is enclosed by a side wall of the housing and it should be noted that, for the purpose of the invention, the Willis inner space and housing space are considered to be similar and are used interchangeably.

It should also be noted that the enclosing structure encloses the membrane stack on the longitudinal sides, but preferably leaves the upper and lower side of the membrane stack open. This allows stacking of multiple enclosing structure to be accommodated in larger external housings. Furthermore, it is noted that the end plates are preferably configured for sealing off the upper and lower side of the enclosing structure to complete seal off the membrane stack and/or the housing space from the environment outside the external housing.

It is furthermore noted that the stack assembly according to the invention can be employed for a variety of different purposes, which include electrodialysis, reverse electrodialysis, yet also include the use as flow battery, for example a redox-flow battery, fuel-cell applications or filtration applications.

The stack assembly according to the invention comprises an enclosing structure, which comprises sealing connectors and side plates, which cooperate to enclose the membrane stack. It is noted that the enclosing structure, and most notably the cooperating/connecting parts of the sealing connectors and the side plates may be provided in different ways.

In a first embodiment, the side plates are provided with substantially straight longitudinal edges having a projection that cooperates with a recess in the sealing connector to form a 'puzzle-piece'-like connection. In such an embodiment, the sealing connector may have three sides, in which a first side connects to a side plate, a second side connects to a side plate and a third side is shaped to have a similar form as the inner wall of the external to which it connects and/or abuts.

In a second embodiment, the longitudinal edges of the side plates may have chamfered edge, wherein the chamfered edge of a first side plate is configured to cooperate with the chamfered edge of an adjacent side plate, and wherein the sealing connector comprises at least a thin sheet of sealing material extending between the chamfered edges of the side plates, wherein one or both longitudinal edges of the thin sheet of sealing material of the sealing connector may optionally be provided be with a, preferably cylindrical, sealing strip that preferably extends over the entire longitudinal length of the sealing connector.

However, it is also possible that the sealing connector is formed as a sealing connector assembly, which comprises a thin sheet of sealing material extending between the chamfered edges of the side plates, and additionally comprising one or two, preferably cylindrical, sealing strips that cooperate with, yet are not connected to the thin sheet. In such an embodiment, the sealing strip on an inner side of the enclosing structure would be held in place due to clamping between the membrane stack and the side plates. Furthermore, in such an embodiment, the cylindrical sealing strip on the outer side of the enclosing structure is insertable with the enclosing structure in the external housing, or the external housing may be provided with the external sealing strip before the enclosing structure is inserted into the external housing, leading to an increased flexibility in the manufacturing process.

In a further embodiment, the side plates may be formed by a flow distributor comprising a plurality of flow distributor elements that are tightly packed between the membrane stack and the inner surface of the side wall of the external housing. The tight packing of the elements, which may for example be spherical or ellipsoid beads or may be (closed) rods/cylinders extending over a length, ensures that they substantially form a plate-like structure.

In an embodiment according to the invention, the side plates may be substantially flat plates having a substantially constant thickness over an entire length and width of the side plate.

An advantage of a constant thickness over the entire side plate is that the side plate are substantially equal to each other and thus easily exchangeable between different stack assemblies.

In addition, side plates with a substantially constant thickness allow the formation of a relatively large flow compartment, which may be provided with a variety of different flow distributor elements, such as plastic or glass beads, elongated cylinders etc.

In an embodiment according to the invention, the side plates may have a curved side that is positioned opposite from the side that is facing the side of the membrane stack, wherein the curvature of the curved side is substantially identical to the curvature of the inner wall of the external housing, and wherein the curved side is provided with an opening or indentation that extends substantially parallel to the central axis. Preferably, the opening or indentation forms the flow compartment or manifold, wherein the flow compartment or manifold is delineated by the side plate adjacent the opening and a part of the internal wall of the external housing.

An advantage of a side plate having a curved side is that the flow compartment, which forms the manifold, can be provided in a specific form and/or with a specific size. The side plates can be provided with flow channels extending from the flow compartment towards a side of the membrane stack to supply the membrane stack with fluid.

In addition, as with the flat side plates, the curved side plates can for example be provided by means of injection moulding, which results in relatively cheap side plates that can also be easily be exchanged.

In an embodiment according to the invention, the enclosing structure is connected to the membrane stack for forming a unit, and wherein the enclosing structure is removably positioned in the housing space.

The enclosing structure can be connected to the membrane stack in a variety of different ways. This for example includes a disconnectable connection, a fixed connection or a combination of fixed and disconnectable connections. In a preferred elaboration, the sealing connectors are fixedly connected to the membrane stack, whereas the side plates are removably connected to the membrane stack. This provides the advantage that the side plates can be removed to replace them with side plates having a different configuration. This allows the stack assembly according to the invention to be used for a wide variety of applications by using a single membrane stack for different applications. An advantage of connecting the enclosing structure to the membrane stack is that the enclosing structure may be used for handling and/or placing the enclosing structure in the housing space of the external housing. In other words, after connecting the enclosing structure to the membrane stack, it is possible to displace the entire unit by holding the enclosing structure rather than only the (delicate) membrane stack. As a result, the risk of damage to the membrane stack during placement in the housing space of the external housing is significantly reduced compared to the known practice in which the membrane stack does not have a protective cover (in the form of the enclosing structure).

Another advantage is that the external housing, due to the fact that the enclosing structure can be removed from the external housing, is that the external housing is reusable and/or recyclable. This is especially interesting with regard to industrial sites to increase operational time of installations, since the external housing does not need to be removed. Only the (relatively firm) enclosing structure is removed from the external housing by sliding it out and replacing it with a different unit (formed by enclosing structure and membrane stack). The removed unit may than be disposed or cleaned for renewed use, while the downtime of the installation is kept to a minimum.

In an embodiment of the invention, the enclosing structure may fixedly be connected to the membrane stack, such that it forms an integral unit.

An advantage of forming an integral unit in which the membrane stack and the enclosing structure are fixedly connected is that, due to an increased stiffness of the unit, a strong and resilient unit is formed that can easily be transported outside the external housing and/or easily be placed in the external housing.

In an embodiment according to the invention, the enclosing structure may releasably be connected to the membrane stack.

An advantage of releasably connecting the membrane stack and the enclosing structure to each other is that the enclosing structure, or at least parts thereof, may be reused when the need arises to replace old, damaged and/or fouled membranes. The enclosing structure can simply be disconnected from a membrane stack to be discarded and reconnected to a membrane stack to be placed. As a result, a reduction in raw material, and thus costs, can be achieved.

In an embodiment according to the invention, the stack assembly may comprise a number of flow compartments, wherein each flow compartment may be delineated by a side of the enclosing structure and an associated part of the inner surface of the external housing that may extend from a first sealing connector of the side of the enclosing structure to a second sealing connector of the side of the enclosing structure.

An advantage of flow compartments in the stack assembly according to the invention is that the flow compartments are useable for guiding a feed and/or a discharge flow to the membrane stack. Each flow compartment can for example be used as a feed compartment or as a discharge compartment. Preferably, the function of the compartments is chosen such that a feed compartment and a discharge compartment are positioned on opposite sides of the membrane stack. For example, in case of a square membrane stack, the external housing and the enclosing structure may form four compartments, each of which is positioned on a side of the membrane stack. The compartments can then be provided as two feed compartments and two discharge compartments, in which the feed compartments are positioned adjacent to each other when viewed along a circumference of the external housing.

In an embodiment according to the invention, the number of side plates may be provided with flow openings that are configured to regulate a flow of fluid from the flow compartment to and/or from the membrane stack.

By providing the side plates with flow openings that are configured to regulate the flow of fluid from the flow compartment to and/or from the membrane stack (depending on the chosen flow direction), the flow to the membrane stack can be more evenly divided over the membrane stack and/or the membrane cells in the membrane stack. The openings may be of a similar size and shape or may be chosen to have different sizes and/or shapes depending on the flow configuration that is to be achieved by the openings in the side plates. The size of the plurality of openings is preferably expressed as a porosity of the plate, which for the purpose for this invention is similar to a percentage of open area (as opposed to a non-open or solid area) of the total surface area of a side plate. The porosity of the side plate depends on the type of process to be performed with the stack assembly. For processes in which losses due to ionic short-cut are to be reduced and/or prevented, such as RED, the porosity is in the range of 0.1%-75%, preferably in the range of 0.5-50% and more preferably in the range of 1%-25%. For other processes, in which losses due to ionic short-cut currents are less important, the porosity is in the range of 10%-99% (in which, with 99% the side plate is only a frame), preferably in the range of 50%-99%.

Alternatively, the porosity may also be chosen such that it results in a pressure gradient over the plate in the range of 0.1-100 mbar, preferably in the range of 0.1-50 mbar and more preferably in the range of 0.1-15 mbar.

The number of side plates may for the purpose of the invention also be provided as perforated plates in which the flow openings are provided.

The flow openings may advantageously be used to reduce the ionic short-cut currents by adapting the length of the openings (when viewed towards the membrane stack) and the size of the openings.

This embodiment is especially advantageous in conjunction with an enclosing structure that is releasably connectable to the membrane stack, since it allows the side plates to be replaced, for example by side plates having openings with a different size, which increases flexibility of the stack assembly with regard to the fluids used in the stack assembly (i.e. different fluids may require different sizes of flow openings to regulate the flow).

In a preferred embodiment, at least part of the flow opening are provided with hollow flow projections, such as tubes or pipes, that extend from the side plate surface towards the inner wall of the external housing.

An advantage of providing hollow flow projections is that the projections reduce ionic short-cut currents in the stack assembly. This is due to the fact that the projections increase the fluid flow path length and thus the ionic resistance, which in turn leads to a reduction in ionic short-cut currents.

In an embodiment, the side plates may be provided with a honeycomb structure forming openings.

An advantage of a honeycomb structure is that it converts a flow through the openings from a substantially turbulent to a substantially laminar flow. Furthermore, such structures are relatively light and relatively cheap to manufacture. This may for example be performed by connecting (i.e. welding) tubes together to form a plate having a honeycomb structure. A honeycomb structure may have similar ranges for porosity as mentioned above. For the purpose of the invention, honeycomb should be considered to also include a non-symmetric honeycomb structure.

In an embodiment according to the invention, the stack assembly may additionally comprise a first end plate that is connectable to the first end of the external housing and a second end plate that is connectable to the second end of the external housing, wherein one or both end plates may preferably be provided with flow openings for providing a flow of fluid to and/or from the flow compartments.

The first and second opening of the external housing are preferably provided with end plate to enclose the membrane stack and the enclosing structure in the external housing. As such, the end plates, which are preferably placed after inserting the enclosing structure with the membrane stack in the external housing, are connected to the openings of the external housing to close the inner space of the housing. Preferably, at least one of the end plates is provided with one or more flow openings to allow feed and/or discharge flow to respectively enter and/or exit the inner space. Preferably, each of the one or more flow openings are associated with one of the flow compartment that is formed in the inner space and is in fluid connection therewith.

In an embodiment according to the invention, one or both of the first and second end plate may be provided with an electrode compartment that is connectable with an electrode, wherein the electrode is operatively connected to the membrane stack. The electrode is preferably configured for converting an ionic current into an electrical current or vice versa. Furthermore, the electrode compartment may comprise an electrode and/or an electrolyte in the compartment.

In an embodiment according to the invention, in which one or both of the first and second end plate is provided with an electrode, at least one of the electrode is removably connected to the associated end plate.

An advantage of having at least one removable electrode is that, when the stack assembly is in an assembled state, the housing space is accessible by removing the electrode. This obviates the need for removing the end plate and disconnecting any fluid conduits connected to the end plate. Therewith, it allows the membrane stack, the enclosing structure and/or the housing space to be accessible, for example for maintenance and/or cleaning. This may mean that only the electrode is removed or an electrode compartment (including an electrode) is removed from the end plate. In case of an electrode compartment, the feed/discharge openings may be connected thereto and may be removed with the electrode compartment such that the (end) membrane is accessible or even removable.

Another advantage is that the electrode and/or the top membrane of the membrane stack is easily replaceable without having to remove the end plates. This reduces maintenance costs.

In an embodiment according to the invention, each end plate of the stack assembly may be provided with a sealing ring, wherein the sealing ring is positioned between the end plate and the opening of the external housing with which the end plate is associated, wherein the sealing ring provides a fluid-tight sealing between the end plate and the corresponding opening of the external housing.

By sealingly closing off the connection between the end plate and the opening of the external housing, the inner space is effectively sealed off from the environment, which reduces pollution risks and increases performance.

In an embodiment according to the invention, at least one of the number of side plates comprises a frame having a central opening that has a length and a width and a porous layer that is positioned in the central opening of the frame, wherein the porous layer is configured for guiding a fluid flow to and/or from the membrane stack.

It is found that providing a layer of porous material through which the fluid flow is guided provides a more even distribution of the fluid flow over the membranes in the membrane stack and simultaneously reduces the ionic short-cut currents compared to known membrane stacks. As a result, the performance of the membrane stack and thus the stack assembly is significantly increased.

In an embodiment, the stack assembly comprises both side plates and a porous layer that covers the flow openings in the side plate (when present), such that the fluid flow passes both through the flow openings in the side plate and through the porous layer. In such an embodiment, the porous layer may be positioned between the side plate and the membrane stack and is preferably positioned on a side of the side plate in the flow compartment. Furthermore, the porous layer may be provided as a separate layer or may be integrally formed on or connected to the side plate.

In an embodiment, the porous layer is provided as a separate layer that extends over the edges of the side plate that are connected to the sealing connectors on at least part of the sealing connectors such that the fluid flow is forced to flow through the porous layer before entering respectively the side plate and the membrane stack. This reduces the risk of leakage of fluid on the side edges of the porous layer near the sealing connectors.

In an embodiment according to the invention, the porous layer may have a porosity in the range of 1%-90%, preferably in the range of 2.5%-75%, and more preferably in the range of 5%-50%.

It is found that a porosity in the abovementioned range allows a highly distributed flow to the membrane stack, significantly reduces (ionic) short-cut currents and simultaneously allows a sufficiently high amount of fluid flow through the stack assembly.

Furthermore, the porous layer also acts as a filter for filtering the fluid before it enters the membrane stack, therewith reducing fouling of the membrane stack. Additionally, the porous layer also breaks down gas bubbles to smaller bubbles, for example when using a gas, such as air, to clean the membrane stack, which lead to a more uniform distribution over the membranes and thus a more efficient cleaning process. Furthermore, broken down gas bubbles are less likely to get trapped in the flow channels/spacers in which they increase pressure drop and/or enhance internal stack resistance and (thus) reducing stack performance.

In an embodiment according to the invention, the thickness and/or porosity of the porous layer may be chosen such that a pressure gradient over the porous layer is in the range of 0.1-100 mbar, preferably in the range of 0.1-50 mbar and more preferably in the range of 0.1-15 mbar and/or wherein a thickness of the layer is in the range of 0.01 mm-100 mm, and preferably in the range of 0.1 mm-10 mm.

In an embodiment according to the invention, the porous layer may be a hydrophilic porous layer.

An advantage of a hydrophilic porous layer is that it improves the fluid flow by lowering the flow resistance.

In an embodiment according to the invention, the porous layer may be a porous foil or a porous netting.

The layer may be provided in different forms, yet preferably are provided as a foil or a porous netting. An advantage thereof is that it is relatively easy to manufacture against acceptable costs. Another advantage is that a foil or netting is easy to apply to the side plate, which allows for a more rapid and efficient manufacturing of the stack assembly. Moreover, foils and netting can be manufactured according to highly accurate specifications to achieve a constant pore sizes and/or porosity. This is especially true for woven or extruded netting made of a plastic.

In an embodiment according to the invention, the side plates and/or the porous layer are manufactured from a non-ionically conductive material, such as a plastic.

In an embodiment according to the invention, the stack assembly is provided with blocking spacers and/or blocking membranes, wherein the blocking spacers and/or blocking membranes are positioned in the membrane stack and wherein a portion of the blocking spacers and/or blocking membranes extends from a side of the membrane stack towards the side plate associated with that side of the membrane, and wherein the blocking spacers and/or blocking membranes connected with the side plate or, in case of multiple side plates, extends between the adjacent side plates.

An advantage of blocking spacers and/or blocking membranes is that it substantially prevents (ionic) short-cut currents. The part of the blocking spacer and/or blocking membrane that extends beyond the side wall of the membrane stack thereto connects with the side plate associated with that side of the membrane stack to block the flow.

In another embodiment, in which the side plate comprises a number of adjacent side plates, the blocking spacer and/or blocking membrane may extend between the adjacent side plates to block the flow parallel to the central axis. In addition, the flow between the side of the membrane stack and the side plate in the direction of the central axis is substantially blocked by the blocking spacer and/or blocking membrane.

In an embodiment according to the invention, the side plate is provided with a blocking element that extends from the side plate towards the side wall of the membrane stack that is associated with the side plate, wherein the blocking element is connected with the side of the membrane stack, or, extends between adjacent membranes of the membrane stack.

An advantage of the blocking element according to the invention is it substantially prevents (ionic) short-cut currents along a central axis. In addition, the flow between the side of the membrane stack and the side plate in a direction parallel to the central axis is substantially blocked by the blocking spacer and/or blocking membrane.

In an embodiment, the side plate and/or the membrane stack is provided with a flow diverter to provide an even further uniform flow from the flow compartment to the membrane stack.

It is noted that the stack assembly according to the invention can be used in a wide variety of applications, which include the abovementioned ED and RED applications. However, a stack assembly according to the invention may also advantageously used in other applications. The invention therefore also relates to an energy storage system comprising a stack assembly according to the invention, a fuel cell comprising a stack assembly according to the invention, a flow battery, for example a redox flow battery, comprising a stack assembly according to the invention and a filtering device comprising a stack assembly according to the invention.

The invention also relates to a method for assembling a stack assembly, the method comprising the steps of:
providing:
an elongated hollow external housing having a central axis and an inner space, the housing extending from a first to a second end;
a membrane stack comprising a plurality of membrane cells;
a number of side plates;
a number of sealing connectors; and
end plates configured for closing the first and second ends;
connecting side edges of the side plates with each other using the sealing connectors to form an enclosing structure configured for enclosing the membrane stack;
positioning the membrane stack in the enclosing structure;
sliding the enclosing structure with the enclosed membrane stack through the first or second end into the inner space of the external housing; and
closing the first and second opening with the end plates.

The method for assembling a stack assembly according to the invention provides similar effects and advantages as the abovementioned stack assembly according to the invention.

An advantage of the method for assembling a stack assembly according to the invention is that the membrane stack can be created and positioned in the enclosing structure, which subsequently can be used to transport and/or insert the membrane stack into the external housing. As a result, the entire unit formed by the membrane stack and the enclosing structure is removable (and thus exchangeable) with regard to the external housing. Furthermore, the enclosing structure can relatively easily be assembled, since the assembly of the enclosing structure can be performed outside the external housing. As such, the method according to the invention allows for a more efficient and easier assembly of the membrane stack.

Another advantage is that the connection between the membrane stack and the enclosing structure, as well as the connection between the enclosing structure and the external housing can be performed using one of a variety of different connection methods. This allows for example the use of disconnectable connections, resulting in a modular stack assembly of which the different components can be replaced and/or reused.

In an embodiment of the method according to the invention, the step of positioning the membrane stack in the enclosing structure may be performed during forming of the enclosing structure in that in a first step, a side plate is positioned against each side wall of the membrane stack, and subsequently the step of connecting side edges of the side plates with each other using the sealing connectors is performed.

The invention also relates to a method for generating energy and/or performing an electrodialysis process, the method comprising the steps of:
providing a stack assembly according to the invention;
providing a fluid flow to the stack assembly; and
generating energy from the fluid flow and/or performing an electrodialysis process.

The method for generating energy and/or performing an electrodialysis process according to the invention provides similar effects and advantages as the abovementioned stack assembly and the method for assembling a stack assembly according to the invention.

Further advantages, features and details of the invention are elucidated on the basis of preferred embodiments thereof, wherein reference is made to the accompanying drawings, in which:

FIG. 2C shows a cross-sectional view of a third example of a stack assembly according to the invention;

Figure 1A:
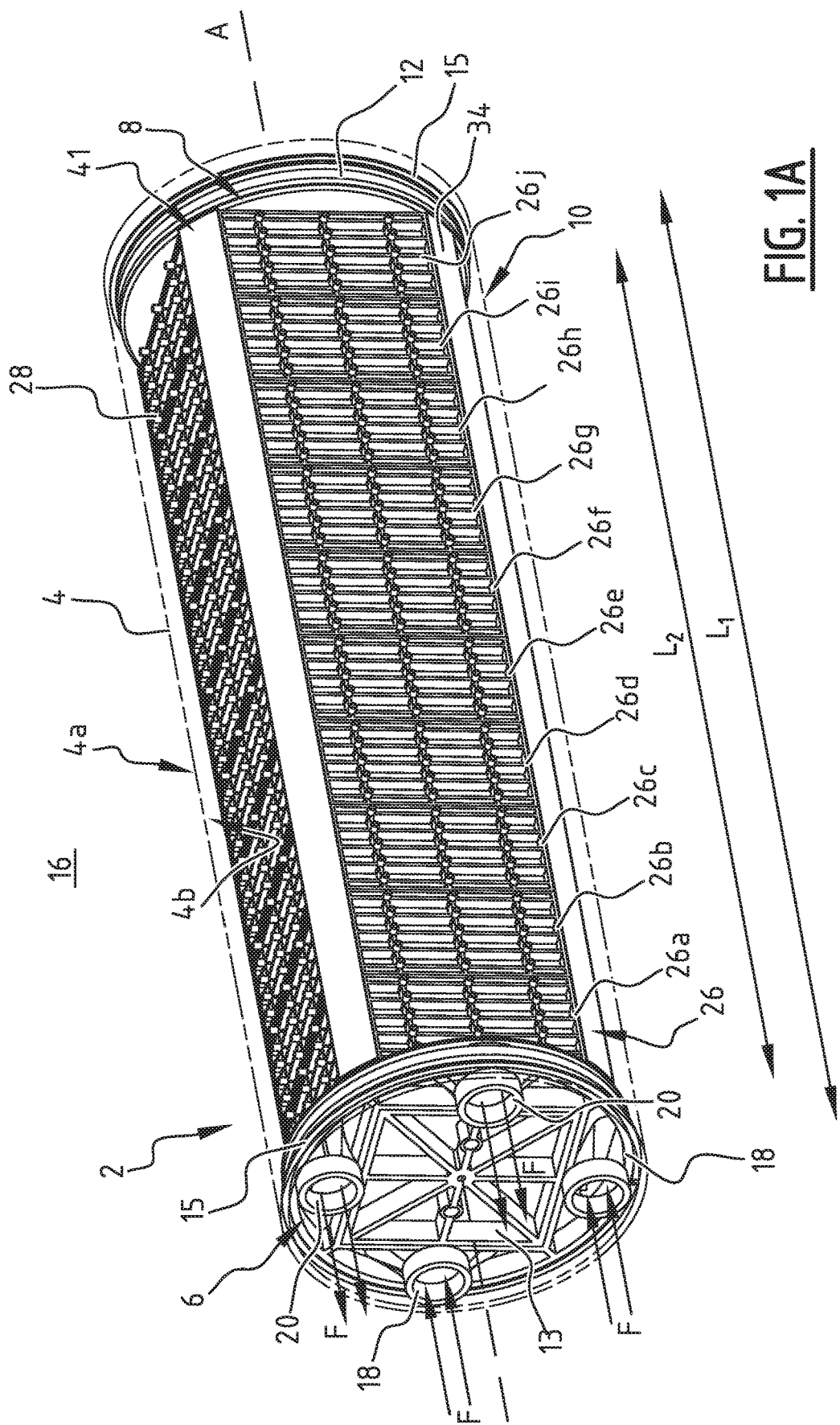
FIG. 1A shows a perspective view of an example of a stack assembly according to the invention.
Figure 1B:
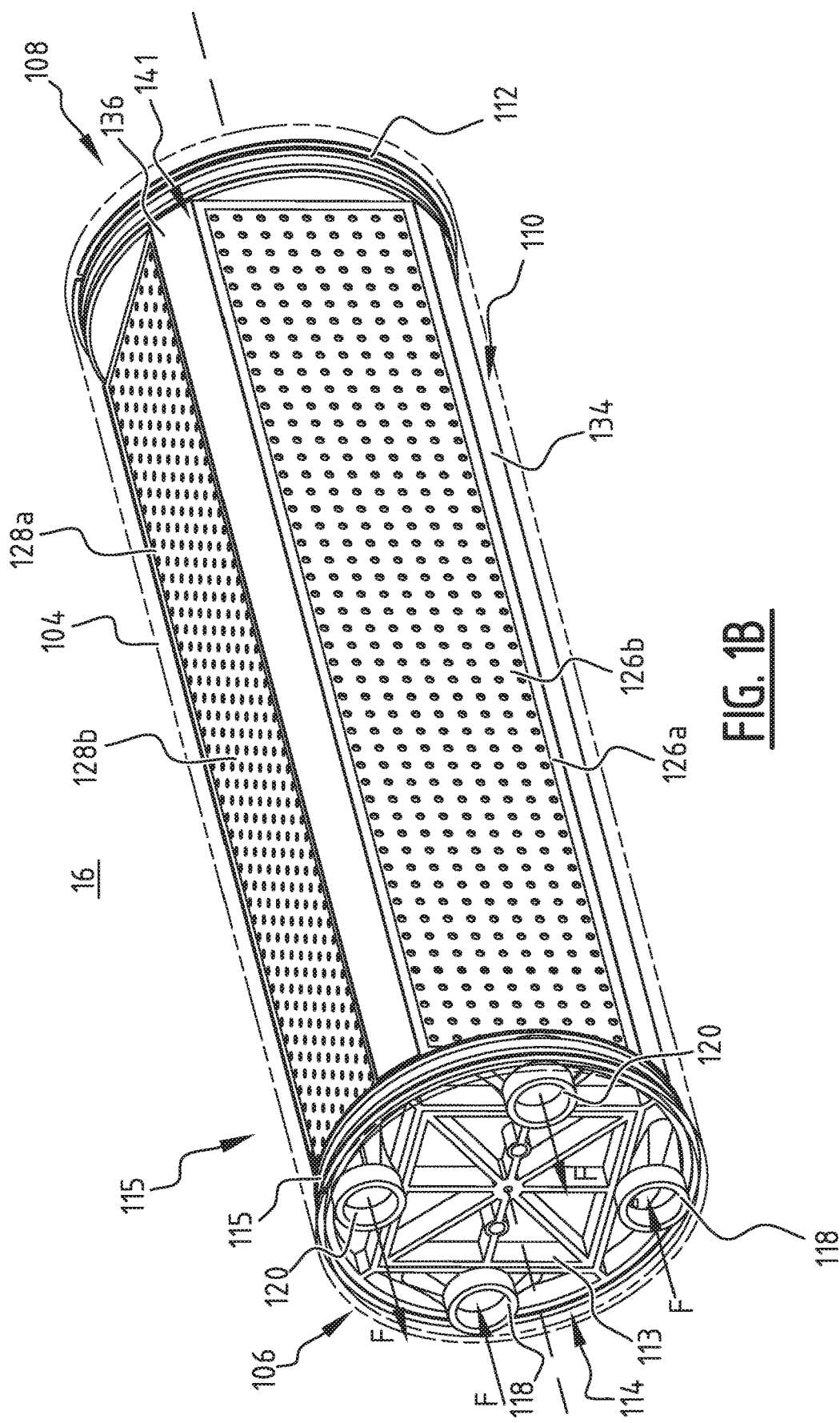
FIG. 1B shows a perspective view of a second example of a stack assembly according to the invention.
Figure 2A:
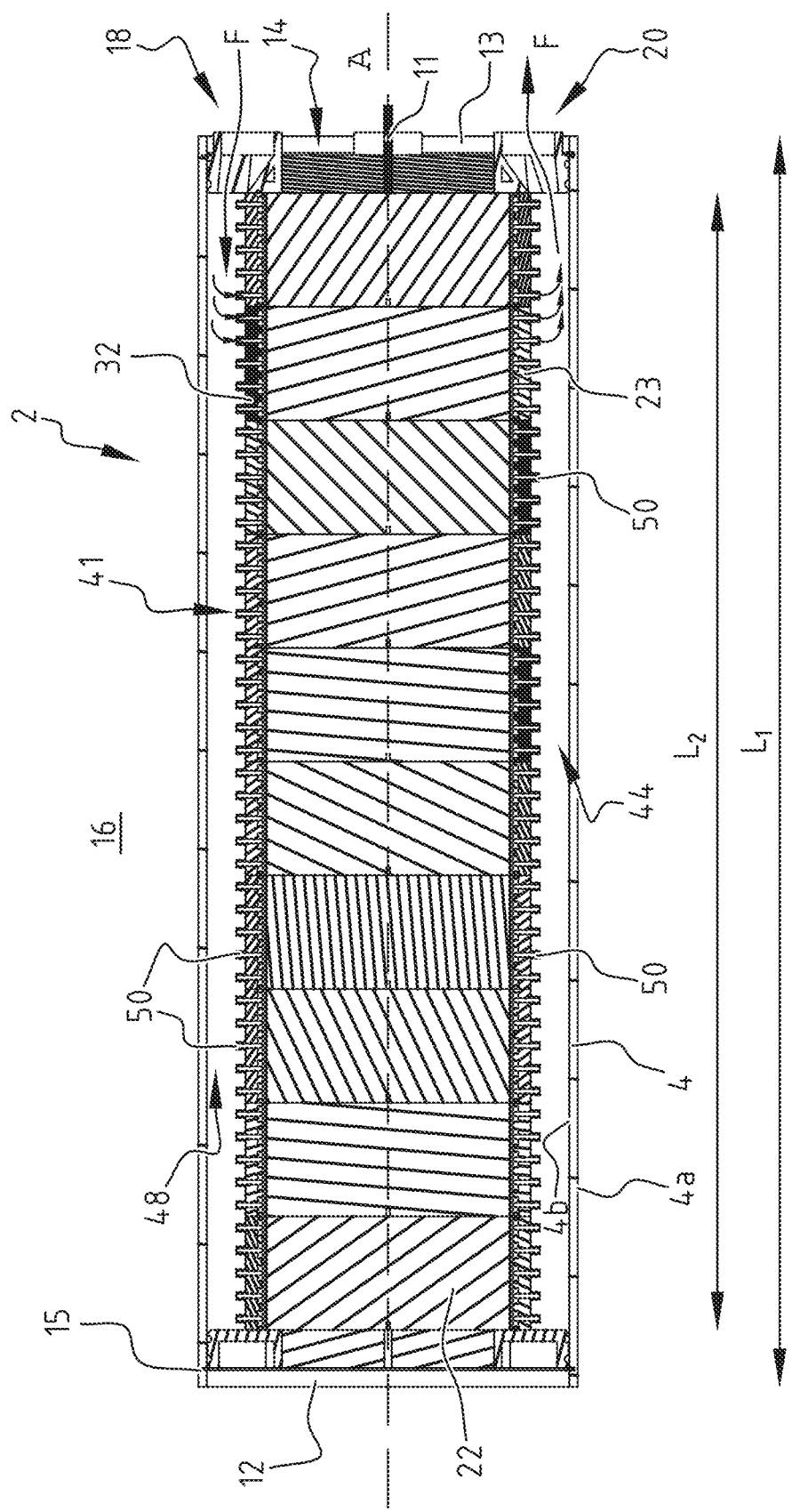
FIG. 2A shows a cross-sectional view of the stack assembly of FIG. 1A.
Figure 3A:
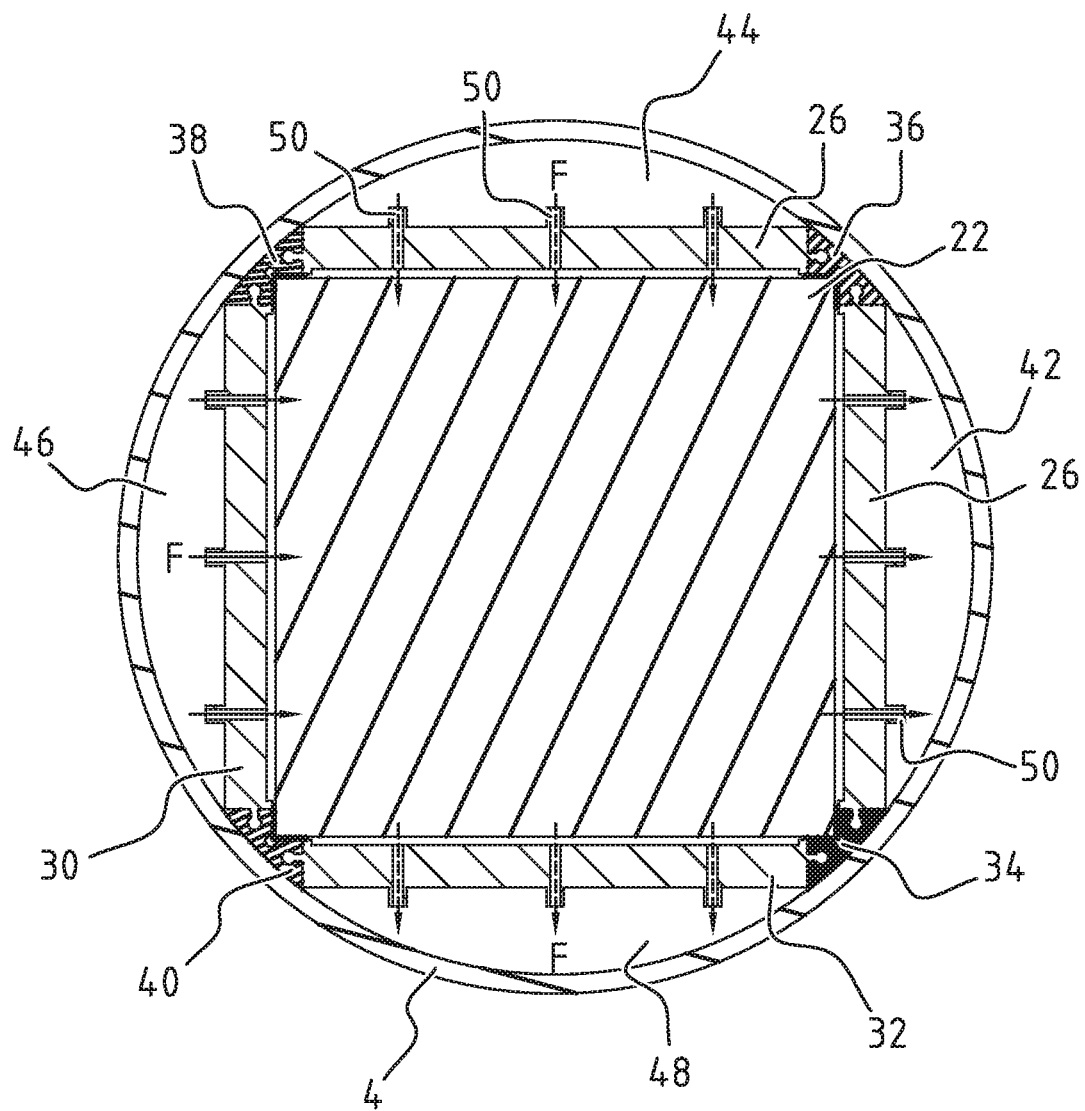
FIG. 3A shows a front view of the stack assembly of FIG. 1A with the end plate removed.
Figure 3B:
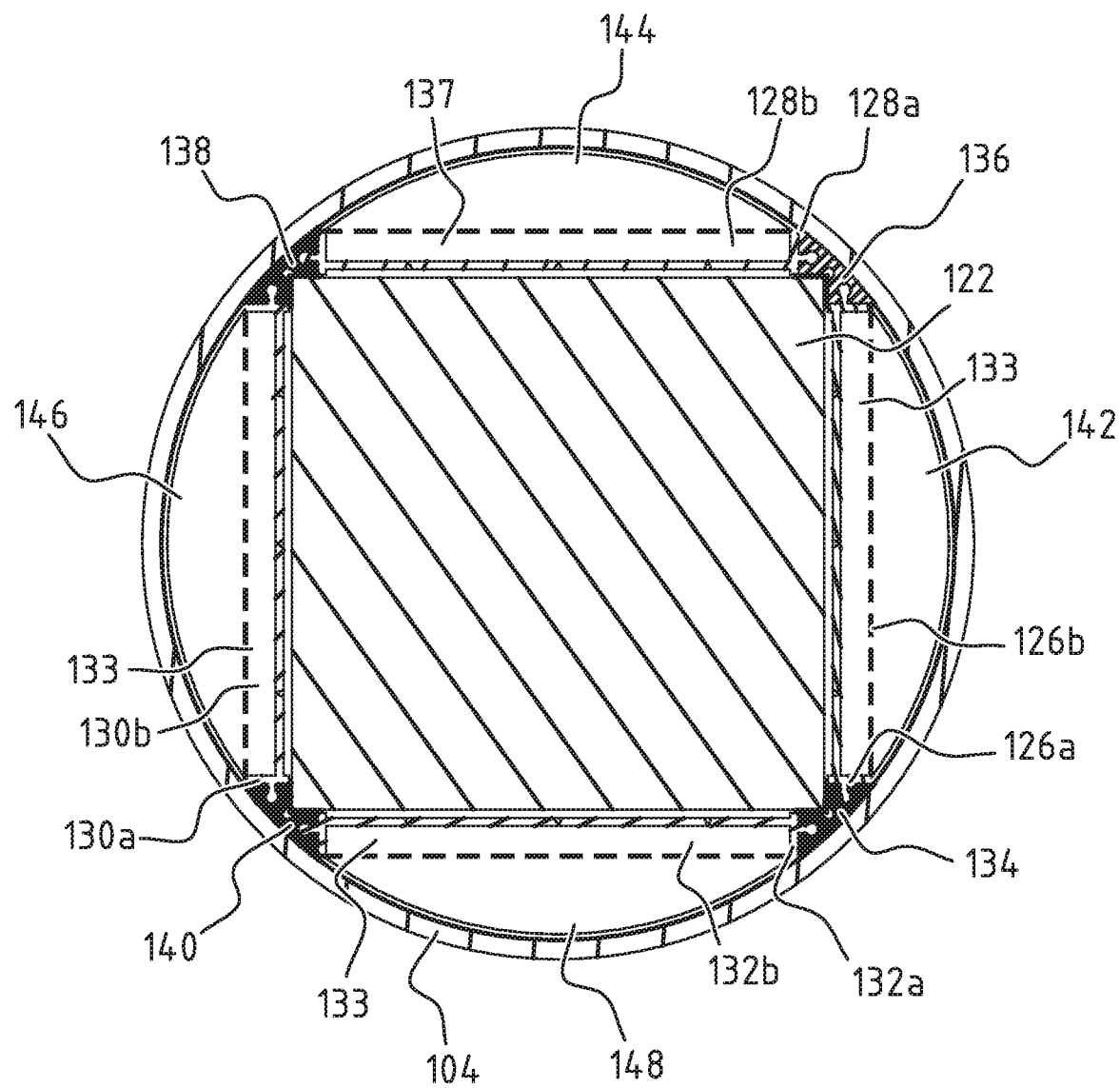
FIG. 3B shows a front view of the stack assembly of FIG. 1B with the end plate removed.

An example of stack assembly 2 according to the invention (see FIGS. 1A, 2A, 3A) comprises elongated tube 4 having outer wall 4a and inner wall 4b and length L1. Elongated tube 4 extends around central axis A from first end 6 to second end 8, which in this example are open ends, and therewith forms housing space 10. First end 6 and second 8 are sealingly closeable by respective end plates 12, 14, therewith sealingly closing housing space 10 from environment 16. End plates 12, 14 are in this example provided with flow openings 18, 20 for allowing a fluid flow into and out of housing space 10. Sealing 15 may be provided between end plates 12, 14 and the respective end 6, 8 of tube 4.

Furthermore, in this example, end plate 12 is provided with electrode plate 13 having electrode 11.

Stack assembly 2 also comprises membrane stack 22 (see also FIG. 6a-b, 7a-b), which is formed by a number of membranes cells 24, 524 that are stacked on each other. Sides 22a, 22b, 22c, 22d of membrane stack 22 are provided with respective side plates 26, 28, 30, 32, which are in this example contiguous with membrane stack 22 and extend over the entire length L2 of membrane stack 22. Side plates 26, 28, 30, 32 are connected to each other through sealing connectors 34, 36, 38, 40 to form enclosing structure 41. Each side plate 26, 28, 30, 32 may be formed of a single plate, yet may also be formed from a number of plates that are positioned next to each other. In this example, side plate 26 includes a number of adjacent side plates 26a, 26b, 26c, 26d, 26e, 26f, 26g, 26h, 26i, 26j. Side plates 28, 30, 32 includes a number of respective adjacent side plates 28a-28j, 30a-30j, 32a-32j.

Each sealing connector 34, 36, 38, 40 may be formed of a single sealing connector or may be formed of a number of sealing connectors that are positioned adjacent to each other when viewed along length L2.

Side plates 26, 28, 30, 32 and sealing connectors 34, 36, 38, 40 together form enclosing structure 41 to enclose and hold membrane stack 22. Enclosing structure 41 may be fixedly connected to membrane stack 22, yet may also be releasably connected to membrane stack 22. The latter can be performed by clamping membrane stack 22 and/or individual membrane cells 24 of membrane stack 22 in enclosing structure 41.

Figure 3C:
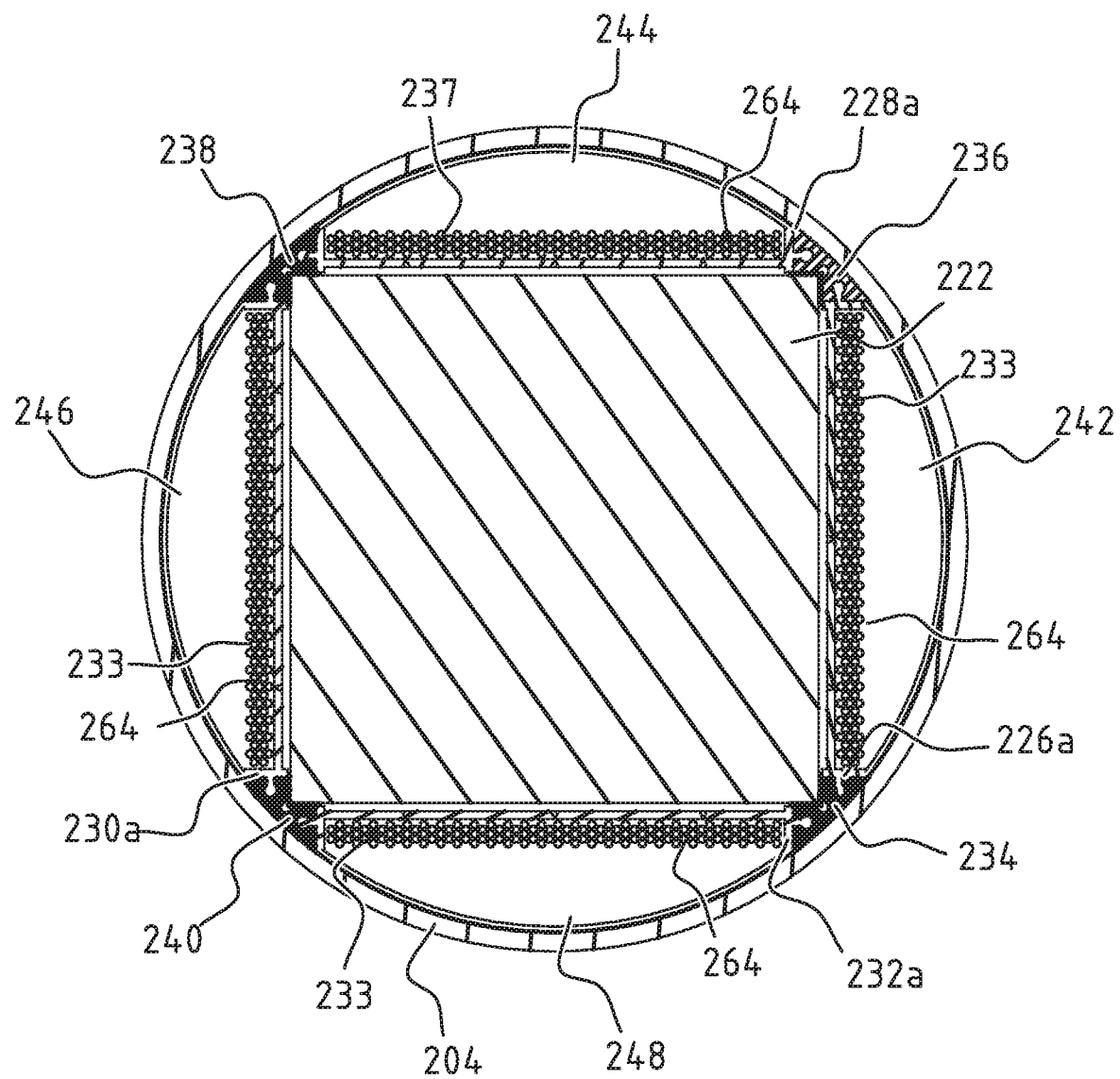
FIG. 3C shows a front view of the stack assembly of FIG. 2C with the end plate removed.
Figure 3D:
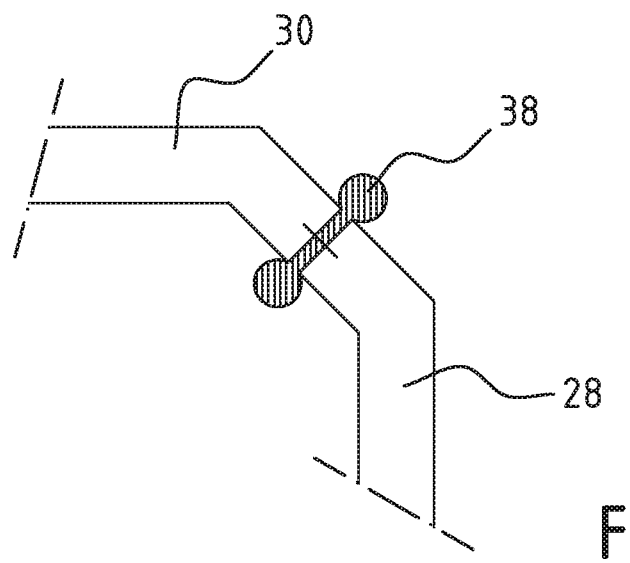
FIG. 3D shows a cut-out view of an alternative connection between a sealing connector and two associated side plates.

In an alternative example (see FIG. 3d), enclosing structure 41 may comprise a different connection between side plates 26, 28, 30, 32 and sealing connectors 34, 36, 38, 40 together form enclosing structure 41 to enclose and hold membrane stack 22. In this example, sealing connectors 34, 36, 38, 40 are relatively thin and side plates 26, 28, 30, 32 are provided at a relatively short distance from each other.

Enclosing structure 41 is configured to be slidingly insertable in elongated tube 4, such that sealing connectors 34, 36, 38, 40 are in sealing connection with inner wall 4b of external housing 4, which in this case is elongated tube 4.

When enclosing structure 41 and enclosed membrane stack 22 are inserted in elongated tube 4, the sealing connection between sealing connectors 34, 36, 38, 40 and inner wall 4b result in the formation of flow compartments 42, 44, 46, 48. In this example (see FIG. 3A) each flow compartment 42, 44, 46, 48 is delineated by two sealing connectors, one side plate and a part of inner wall 4b. For example, as can be seen in the FIGS. 1A, 2A, 3A, flow compartment 42 is delineated by sealing connectors 34, 36, side plate 26 and a part of inner wall 4b.

Side plates 26, 28, 30, 32 are provided with a number of flow openings 50, which regulate the flow of fluid from flow compartments 42, 44, 46, 48 to membrane cells 24 of membrane stack 22. In this example, a membrane cell 24, 524 is formed by an AEM and a CEM membrane which are positioned on top of each other. Each membrane cell 24, 524 is formed of two membranes, which are connected to each other on two opposite sides to form a membrane compartment (see FIG. 6a, 6b, 7a, 7b). In this example, the membranes of the membrane compartment are formed by substantially unprofiled membranes in conjunction with (conventional) spacers (wherein the spacers may in some embodiments also be omitted). Alternatively, profiled membranes may be used in conjunction with the flow guides according to the invention. A fluid is guidable from a first side to a second, opposite side (or vice versa) through membrane cell 24, 524. Preferably, the membrane cells are stacked alternatingly, such that a cross-flow stack 22 is realised.

Figure 2B:
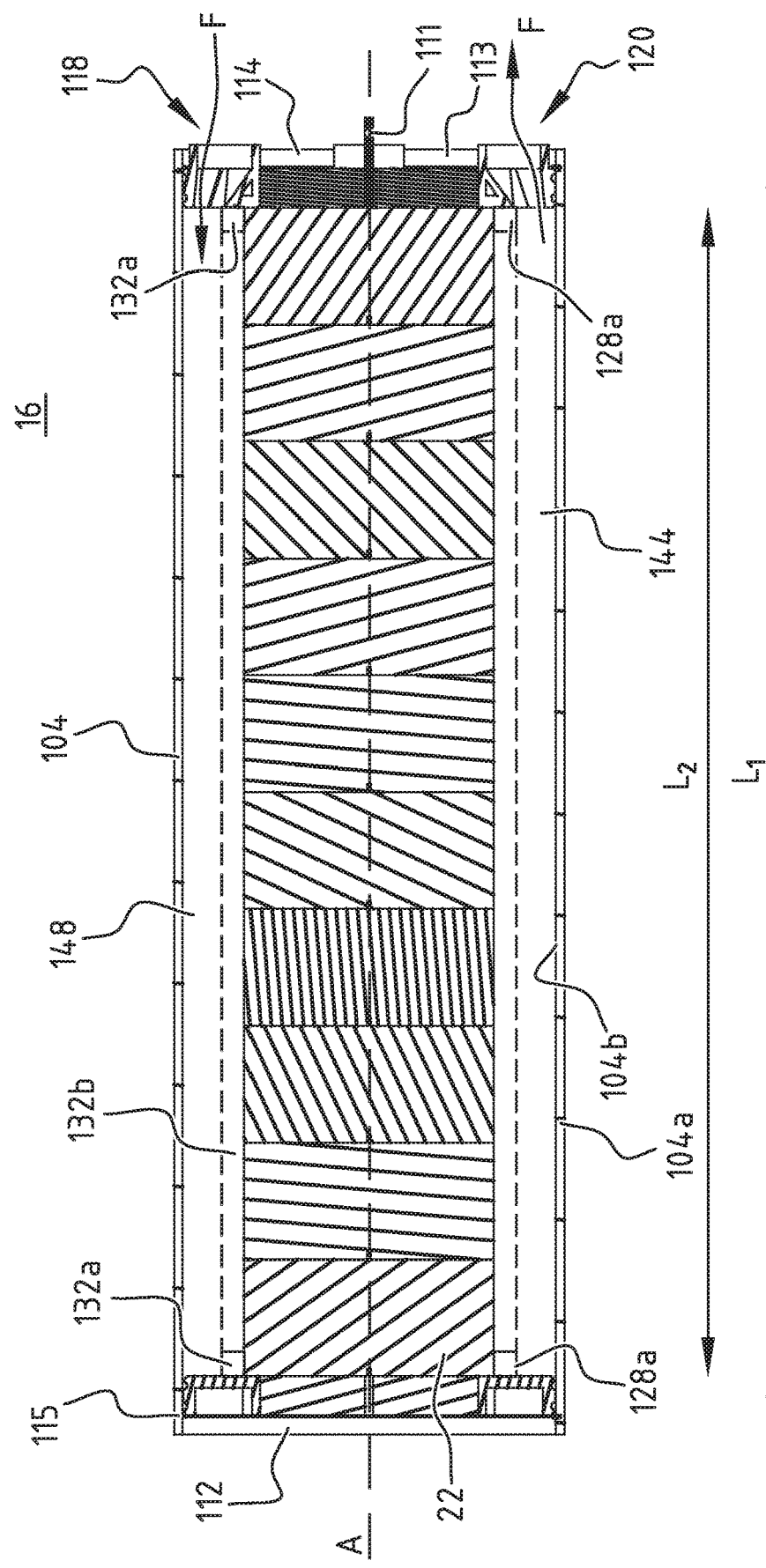
FIG. 2B shows a cross-sectional view the stack assembly of FIG. 1B.
Figure 4:
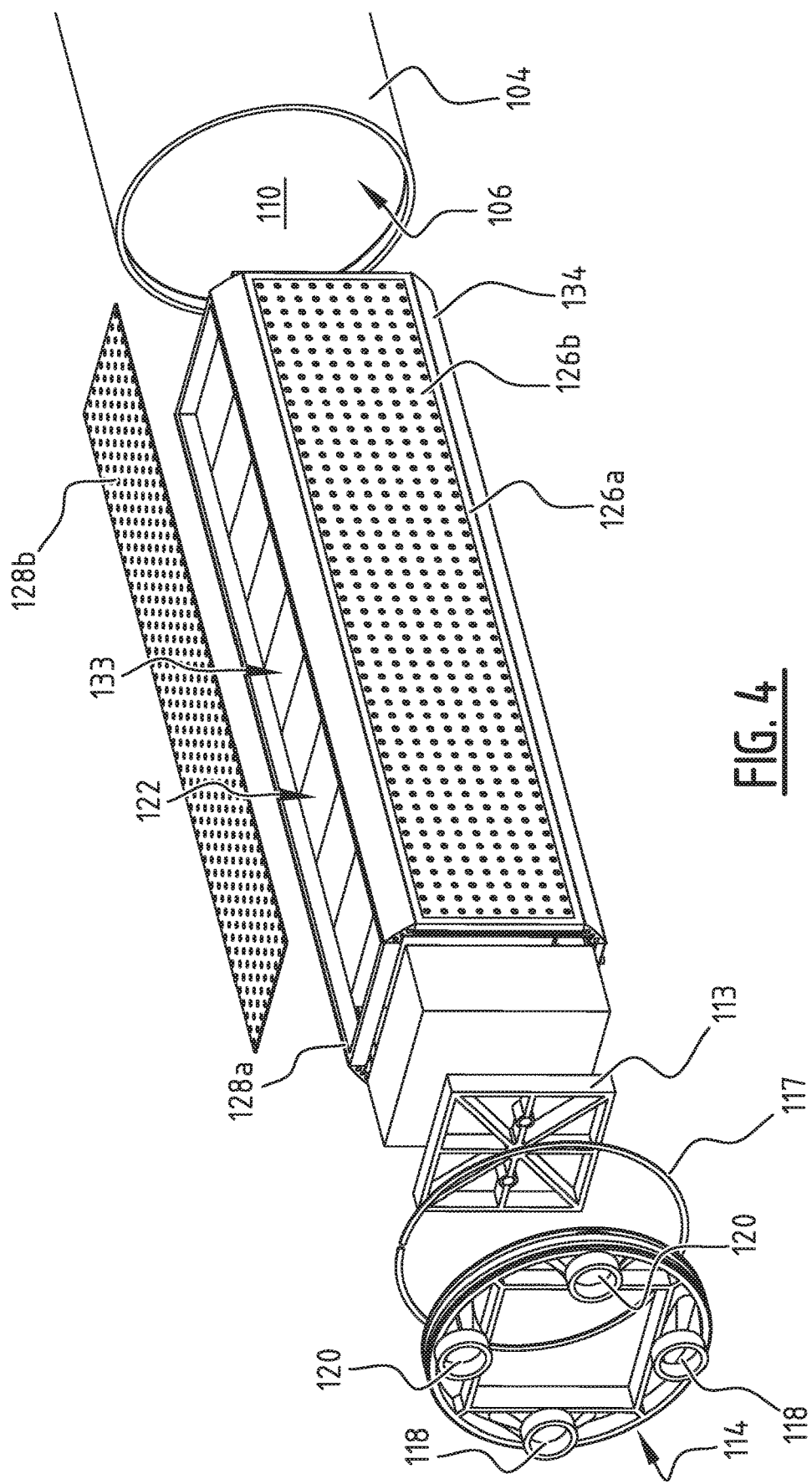
FIG. 4 shows a perspective view of the stack assembly of FIG. 1B.

A second example of stack assembly 102 according to the invention (see FIGS. 1B, 2B, 3B, 4) comprises elongated tube 104 having outer wall 104a and inner wall 104b and length L1. Elongated tube 104 extends around central axis A from first end 106 to second end 108, which in this example are open ends, and therewith forms housing space 110. First end 106 and second 108 are sealingly closeable by respective end plates 112, 114, therewith sealingly closing housing space 110 from environment 16. End plates 112, 114 are in this example provided with flow openings 118, 120 for allowing a fluid flow into and out of housing space 110. Sealing 115 may be provided between end plates 112, 114 and the respective end 106, 108 of tube 104. Furthermore, end plate 114 is in this example provided with electrode plate 113, which is removably connected to end plate 114. Electrode plate 113 preferably includes at least one electrode 111. In addition, FIG. 4 clearly shows a closing/clamping ring 117 which is positioned between end plate 114 and tube 104. Clamping ring 117, which in this example is seeger ring 117, replaces the function of pull rods used in conventional membrane assemblies to hold the membrane stack together. Stack assembly 102 also comprises membrane stack 22, which is formed by a number of membranes cells 24 that are stacked on each other (see also FIG. 6a, 6b). Sides 22a, 22b, 22c, 22d of membrane stack 22 are provided with respective side plates 126, 128, 130, 132, which are in this example contiguous with membrane stack 22 and extend over the entire length L2 of membrane stack 22. Side plates 126, 128, 130, 132 are in this example formed by frames 126a, 128a, 130a, 132a, each of which encloses associated porous layer 126b, 128b, 130b, 132b. Frames 126a, 128a, 130a, 132a are connected to each other through sealing connectors 134, 136, 138, 140 to form enclosing structure 141. Porous layers 126b, 128b, 130b, 132b may be configured to be adjacent and contiguous with membrane stack 22 (as shown in FIG. 2b), yet may also be slightly thinner than associated frames 126a, 128a, 130a, 132a such that an open space or chamber 133 is present between a porous layer 126b, 128b, 130b, 132b and the side of membrane stack 22 positioned within enclosing structure 141 (see FIG. 4). Chamber 133 may also be filled with flow distributor elements 264.

A third example of stack assembly 202 (see FIGS. 2C, 3C) comprises elongated tube 204 having outer wall 204a and inner wall 204b and length L1. Elongated tube 204 extends around central axis A from first end 206 to second end 208, which in this example are open ends, and therewith forms housing space 210. First end 206 and second 208 are sealingly closeable by respective end plates 212, 214, therewith sealingly closing housing space 210 from environment 16. End plate 214 is in this example provided with flow openings 218, 220 for allowing a fluid flow into and out of housing space 210. A sealing may be provided between end plates 212, 214 and the respective end 206, 108 of tube 204. Furthermore, end plate 214 is provided with electrode plate 213, which is removably connected to end plate 214. Furthermore, membrane stack 22 is in this example fixated in elongated tube 204 by means of seeger ring 217.

Stack assembly 202 also comprises membrane stack 22, which is formed by a number of membranes cells 24 that are stacked on each other (see also FIG. 6). In this particular example (see FIGS. 2C, 3C), membrane stack 22 is enclosed by side plates 226, 228, 230, 232 that comprises a frame 226a, 228a, 230a, 232a, wherein each frame 226a, 228a, 230a, 232a, is filled with flow distributor elements 264, which in this example are spherical plastic beads 264 or elongated cylindrical elements 264, wherein the elongated elements 264 preferably extend over substantially entire length L2. Flow distributor elements 264 are packed snugly and in a tight fit in each frame 226a, 228a, 230a, 232a, such that a plate-like structure is formed. This has the advantage that entire enclosing structure 241 including elements 264 can be removed from housing 204.

Figure 2D:
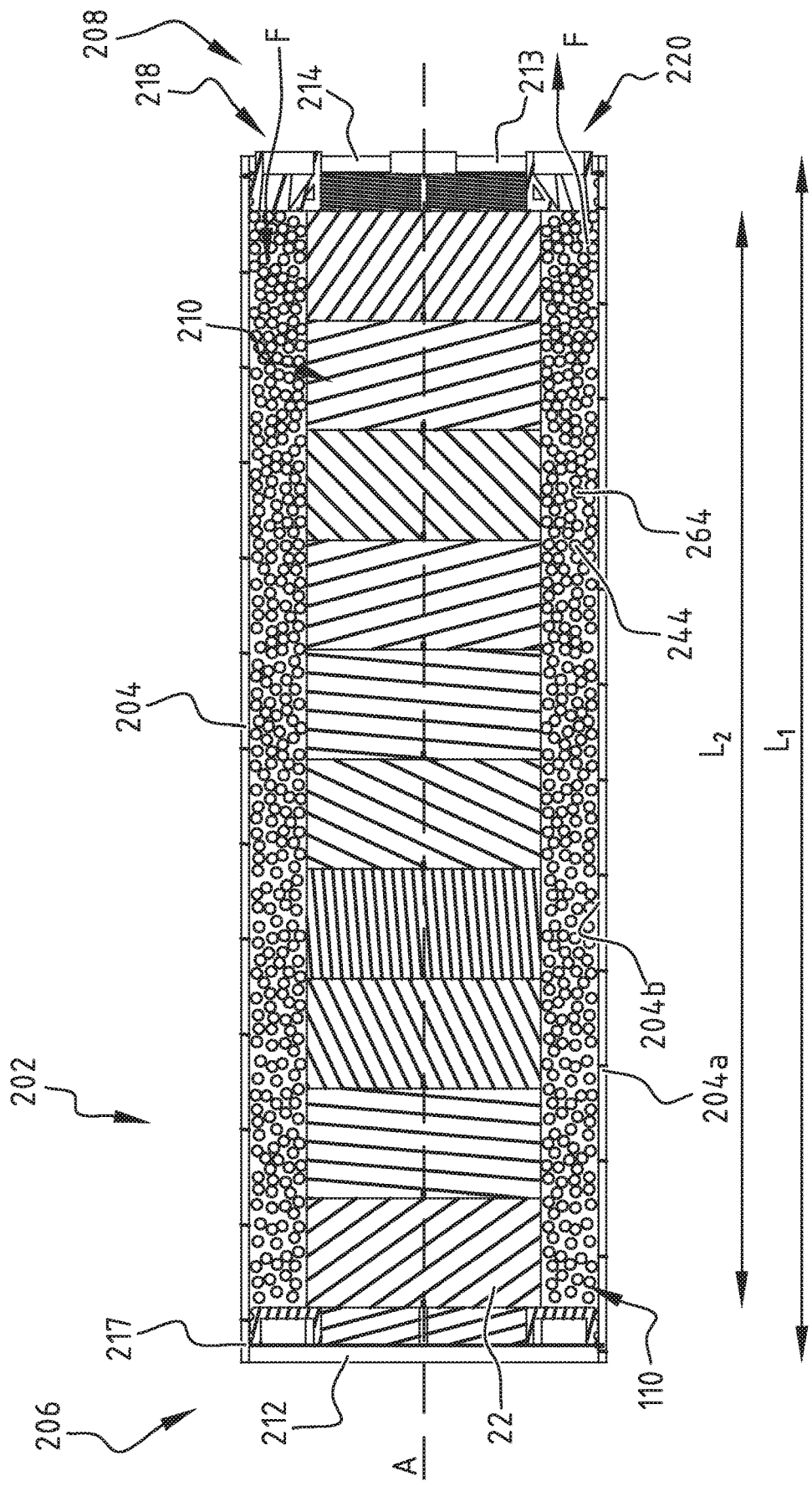
FIG. 2D shows a cross-sectional view of a subsequent example of a stack assembly according to the invention.
Figure 3E:
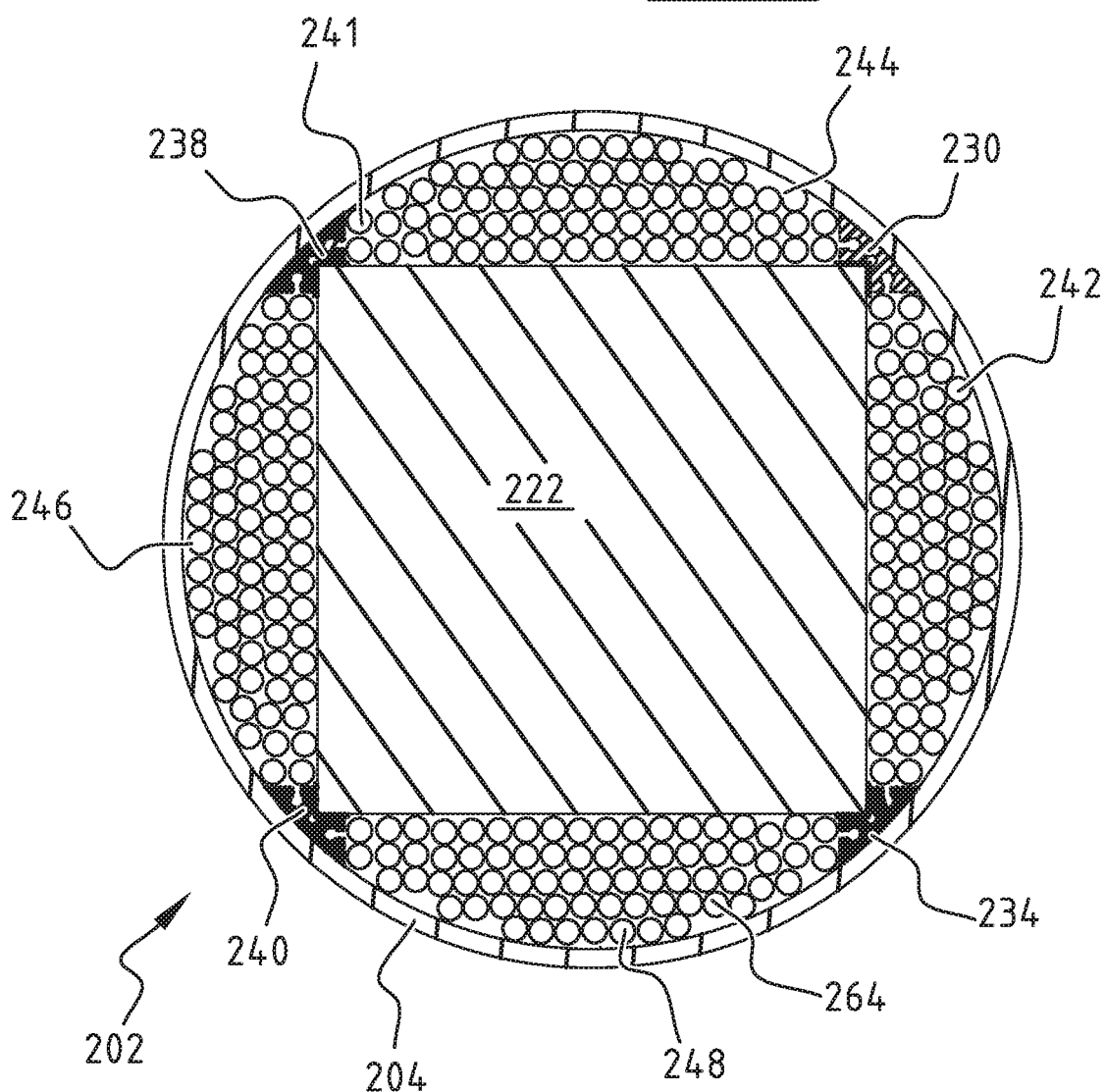
FIG. 3E shows a front view of the stack assembly of FIG. 2D with the end plate removed.

It is noted that stack assembly 202 can also be used in a configuration in which no frame 226a, 228a, 230a, 232a is applied (see FIGS. 2D, 3E). In this particular example (of FIGS. 2D, 3E), flow compartments 242, 244, 246, 248 are, preferably completely, filled with flow distributor elements 264, which in this example are spherical plastic beads 264. Spherical plastic beads 264 which fill flow compartments 242, 244, 246, 248 in this particular embodiment are packed snugly such that they extend from the side of membrane stack 22 up to inner housing wall 4b. Together with sealing connectors 234, 236, 238, 240 they form enclosing structure 241. Combinations of the abovementioned embodiments can however also be used, i.e. partially filled flow compartments 242, 244, 246, 248 with or without side plates. This means that in this particular example the connection between sealing connectors 234, 236, 238, 240 and flow distributor elements 264 which form enclosing structure 241 is not a fixed connection, yet a connection formed using the pressure of flow distributor elements 264 that are snugly fit together in flow compartments 242, 244, 246, 248.

Figure 5:
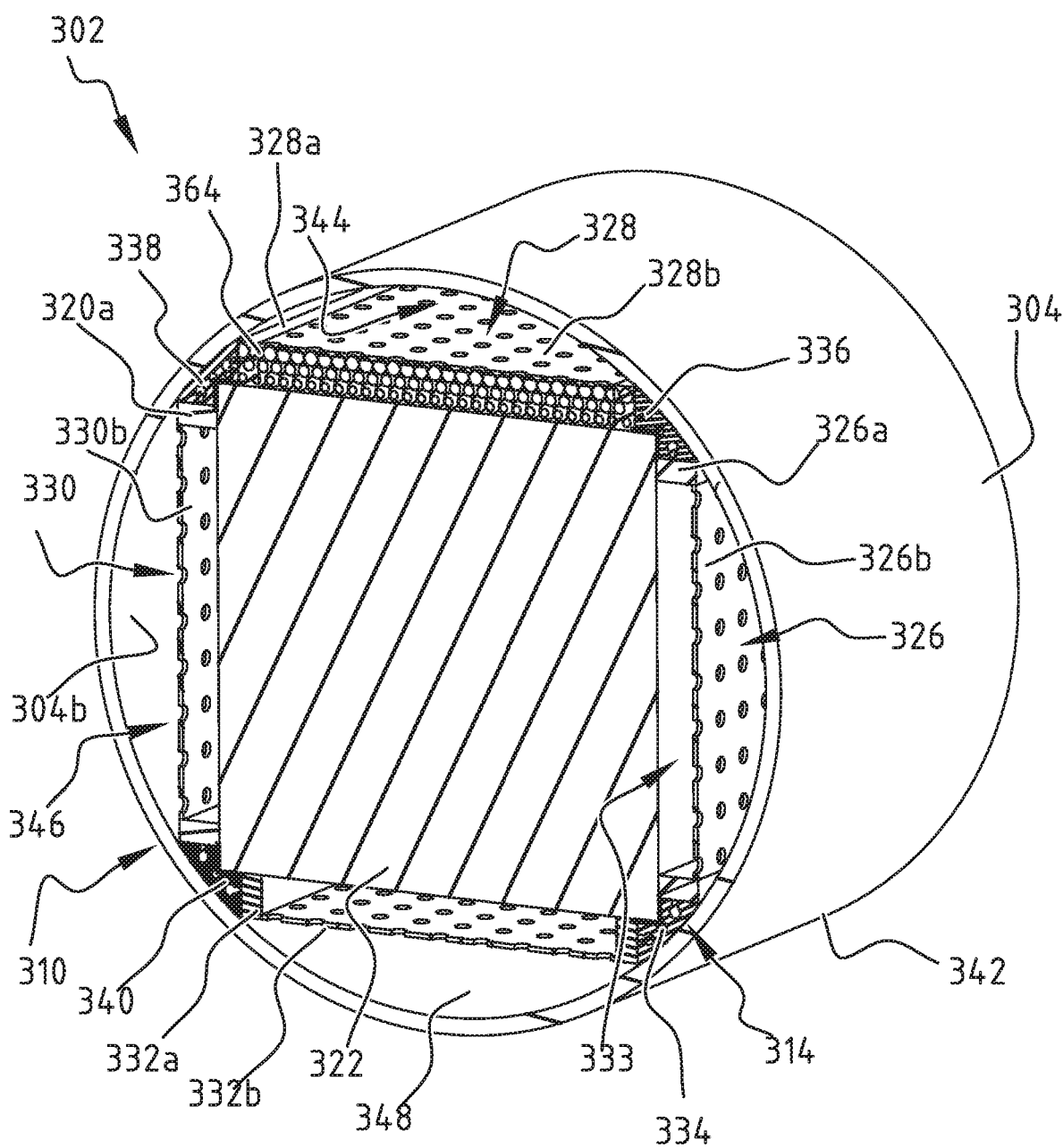
FIG. 5 shows a detailed perspective of a cross-section of a fourth example of a stack assembly according to the invention.

Another example of stack assembly 302 (see FIG. 5) shows a cross-sectional view of elongated tube 304 having housing space 310 in which enclosing structure 314 is positioned. In this example, enclosing structure 314 includes sealing connectors 334, 336, 338, 340 and side plates 326, 328, 330, 332. Side plates 326, 328, 330, 332 in this example consist of a framework 326a, 328a, 330a, 332a, each framework 326a, 328a, 330a, 332a having a central opening in which respective layers of porous materials 326b, 328b, 330b, 332b are positioned. Furthermore, porous layers 326b, 328b, 330b, 332b are thinner than the corresponding frameworks 326a, 328a, 330a, 332a, in which they are positioned, therewith forming space or chamber 333 between porous layers 326b, 328b, 330b, 332b and the associated side of enclosed membrane stack 22. In this example, one of the chambers 133 is filled with flow distributor elements 364, which are in this case spherical beads 364. Although one or more chambers 133 may be kept open, in practice it is preferred that either none or all chambers 133 are filled with flow distributor elements 264. In addition, FIG. 5 shows flow compartments 342, 344, 346, 348 that extend between inner wall 304b of tube 304 and respective porous layers 326b, 328b, 330b, 332b.

Figure 5A:
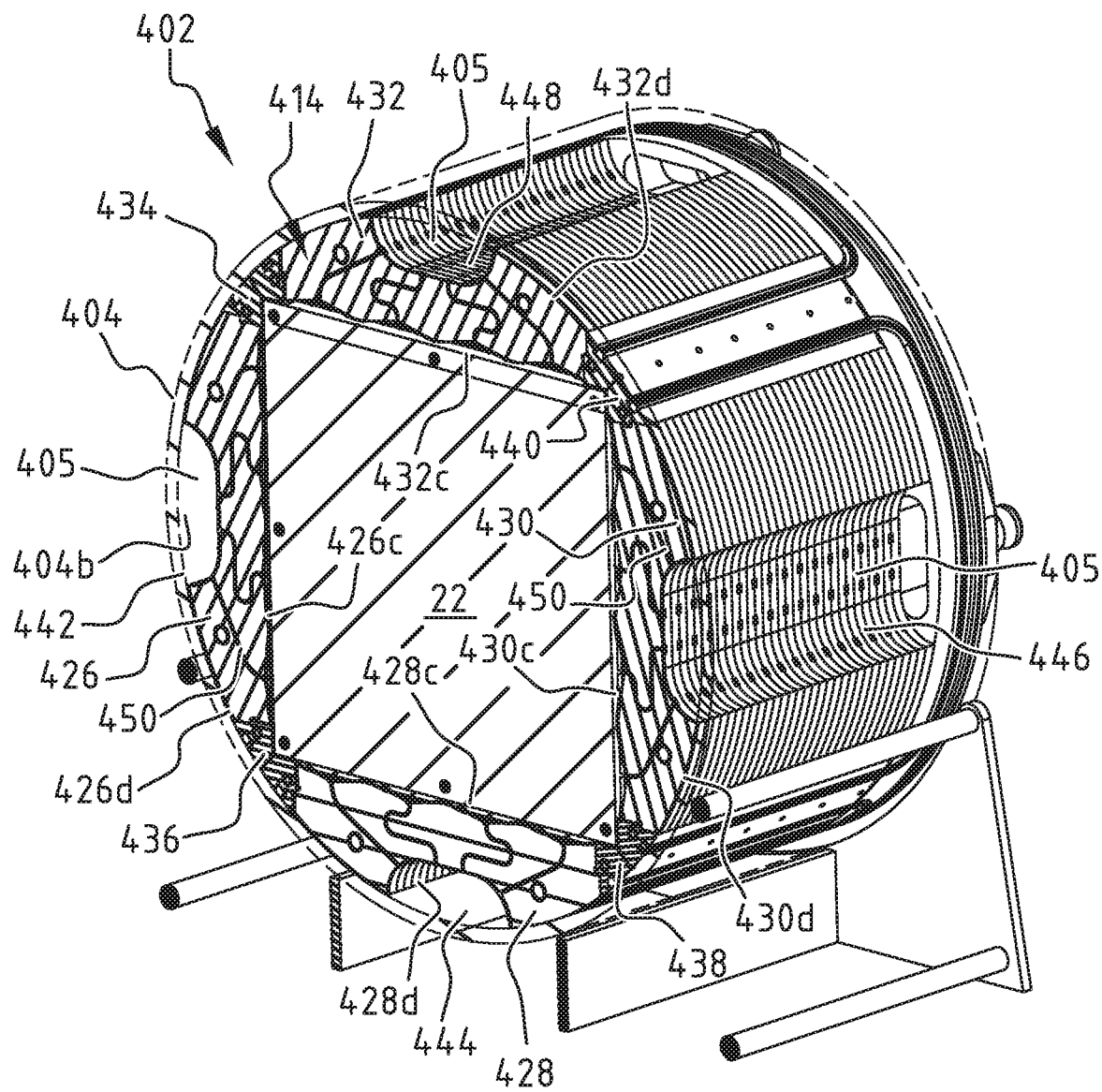
FIG. 5A shows a detailed perspective of a cross-section of a fifth example of a stack assembly according to the invention.
Figure 5B:
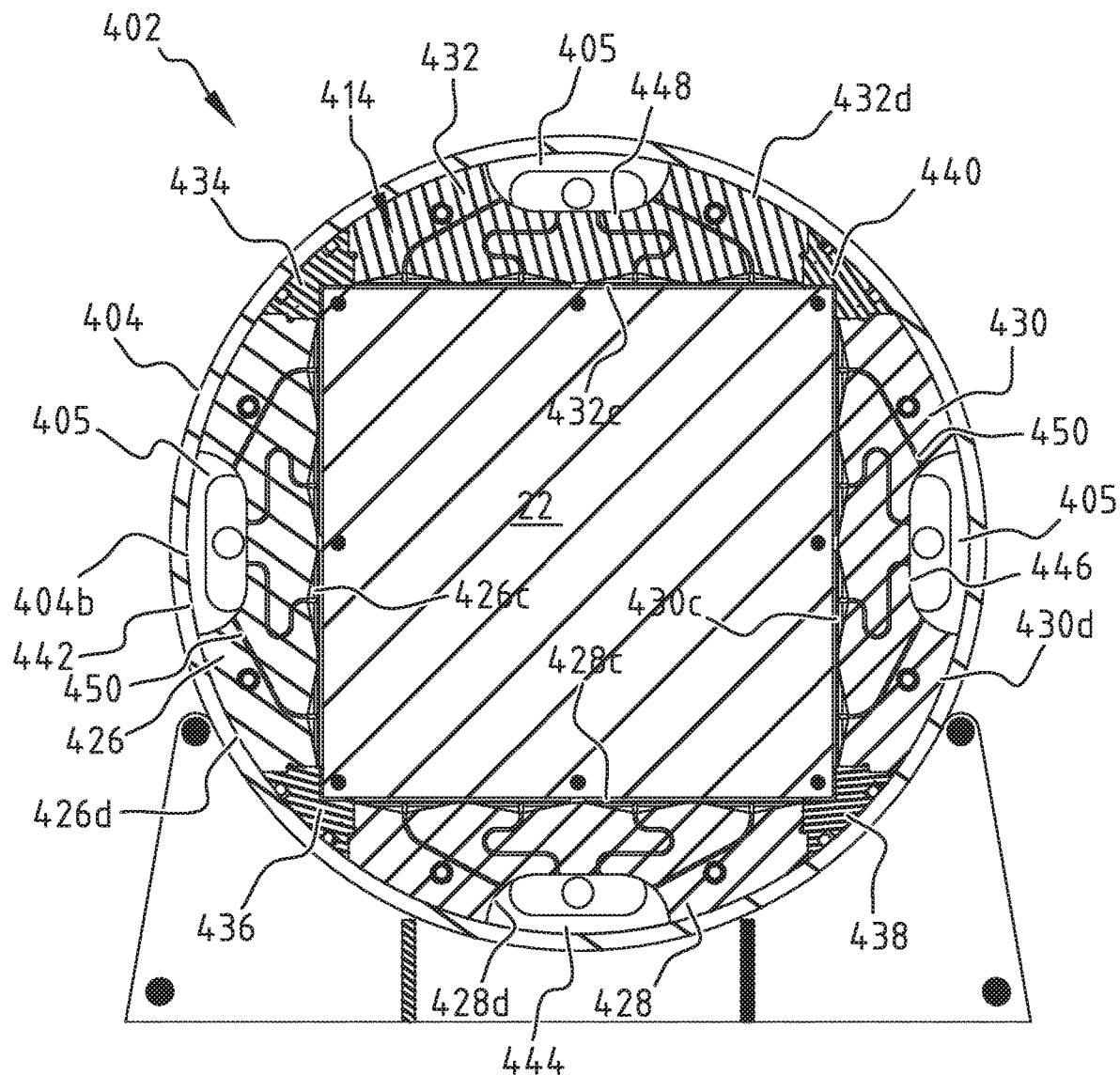
FIG. 5B shows a front view of the stack assembly of FIG. 5A (without end plate)
Figure 6A:
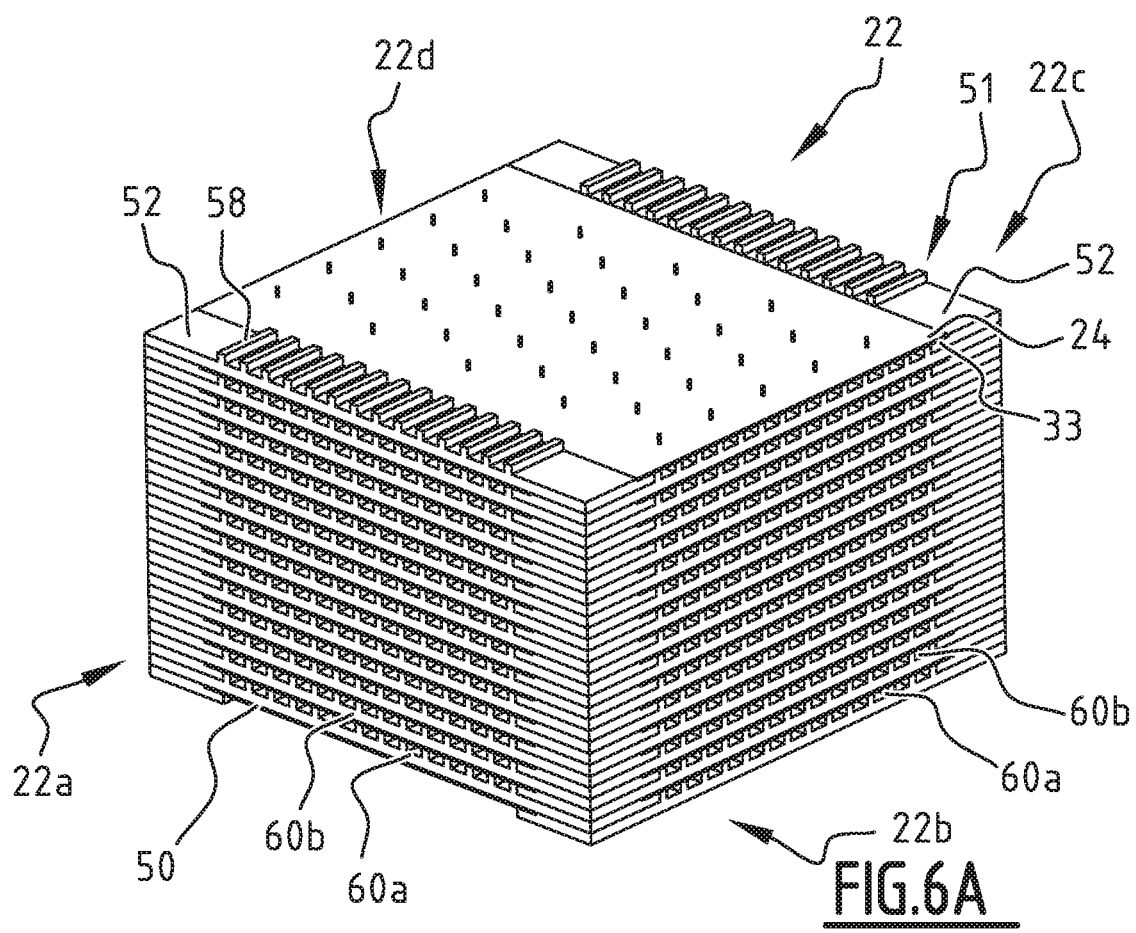
FIG. 6A shows an example of a membrane stack according to the invention.
Figure 6B:
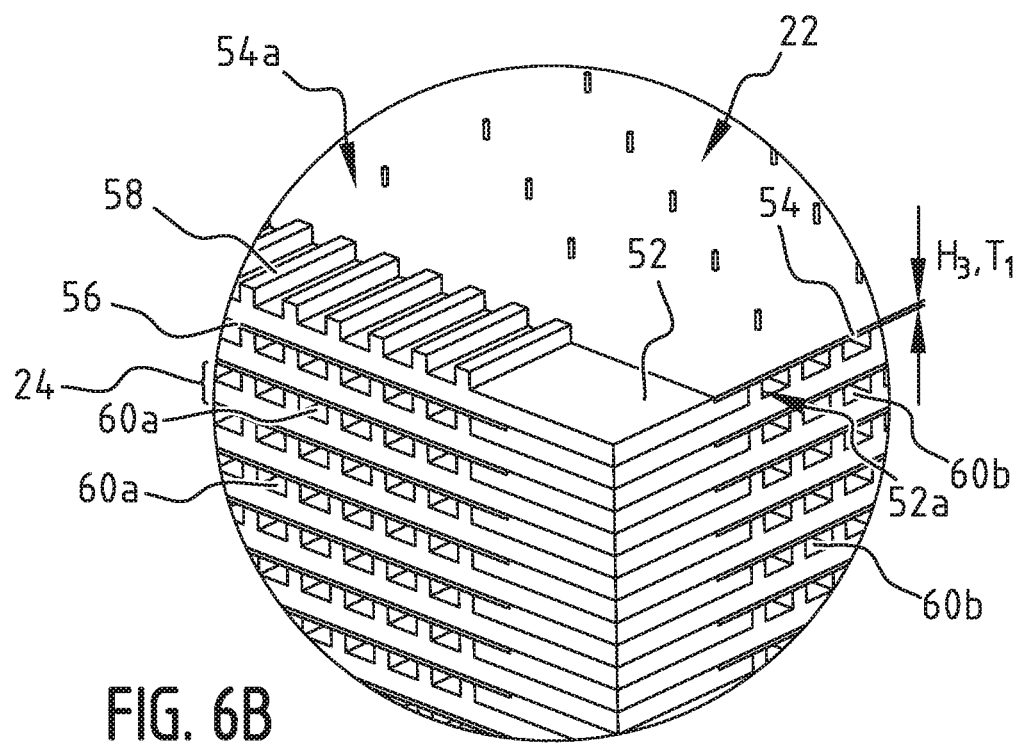
FIG. 6B shows a detailed view of the membrane stack of FIG. 6A.

Another example of stack assembly 402 (see FIGS. 5A, 5B) show a cross-sectional view of elongated tube 404 having housing space 410 in which enclosing structure 414 is positioned. In this example, enclosing structure 414 includes sealing connectors 434, 436, 438, 440 and side plates 426, 428, 430, 432. Side plates 426, 428, 430, 432 in this example are formed such that the substantially fill the entire space between the sealing connectors 434, 436, 438, 440, the associated side of membrane stack 22 and the inner wall 404b of external housing 404. To that end, side plates 426, 428, 430, 432 comprise a surface 426c, 428c, 430c, 432c that is positioned adjacent the associated side of membrane stack 22 and a curved surface 426d, 428d, 430d, 432d that substantially follows the curvature of the inner wall 404b of external housing 404. Each side plate 426, 428, 430, 432 includes opening 405 that extends substantially parallel to central axis A over substantially the entire length of the side plate. In case of a plurality of adjacent side plates that are positioned along the length of external housing 404, the adjacent side plates have openings 405 that are adjacent such that they extend over substantially the entire length of external housing 404.

Openings 405 are delineated by internal wall 404*b* of external housing 404 and a surface of side plate 426, 428, 430, 432 that extends adjacent opening 405 and form flow compartments 442, 444, 446, 448.

Side plates 426, 428, 430, 432 may internally be provided with openings or flow channels 450 that extends over substantially the entire thickness of associated side plates 426, 428, 430, 432 from opening 405 to the associated side of membrane stack 22. In this example, flow channels 450 are used to increase a flow path length between opening 405 to membrane stack 22 to reduce the (ionic) short-cut currents.

In an example according to the invention, membrane cell 24 also comprises flow guides 51, which are positioned between adjacent membranes 54, 56 (see FIGS. 6*a*, 6*b*, 8*a*, 8*b*). In this example, flow guide 51 has membrane support section 53 to which membrane 54 is attached. In this example, flow guide 51 has a length LF in the range of 20-5,000 mm. The width or depth D1 of flow guide 51 is in the range of 2-150 mm, whereas width (or depth) D2 of flow section 52 is in the range of 1-149 mm. Width D3 of membrane support section 53 is in this example in the range of 1-50 mm. Flow guide 51 in this example has total height H1 in the range of 0.015-4 mm. The height H3 of membrane support section 53 is substantially equal to a thickness T1 of the membrane 54 that is attached to it, such that flow section 52 of strip 51 is at similar level as upper side 54*a* of membrane 54 (see FIG. 6A, 6B). In this example, height H3 is in the range of 0.005-2 mm. Flow guide 51 is furthermore provided with projections 58, which extend to a height that is higher than the membrane surface 54*a*, when viewed from that surface 54*a*. Projections 58 in this example have a height H2 in the range of 0.01 mm-2 mm. Projections 58 thus form flow channels or openings 60*a*-60*d* through which a fluid is guided from flow compartments 42, 44, 46, 48/142, 144, 146, 148/242, 244, 246, 248/342, 344, 346, 348 into membrane cell 24. In this example, flow openings 60 have width W1 in the range of 0.1-50 mm, which is in this example equal to the range of width W2 of projections 58. Flow guide 51 is also provided with flow guide connection sections 52*a*, which have width W3 of 2-150 mm.

Figure 7A:
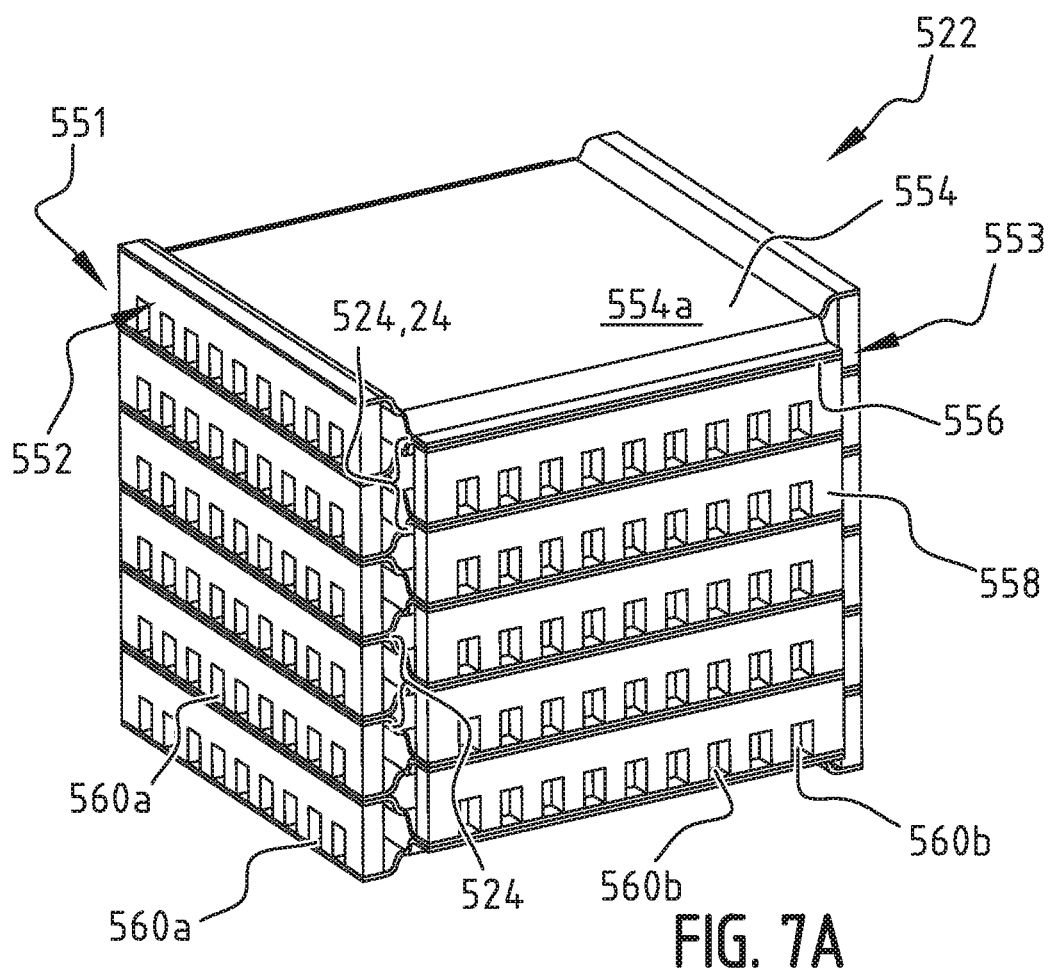
FIG. 7A shows a second example of a membrane stack according to the invention.
Figure 7B:
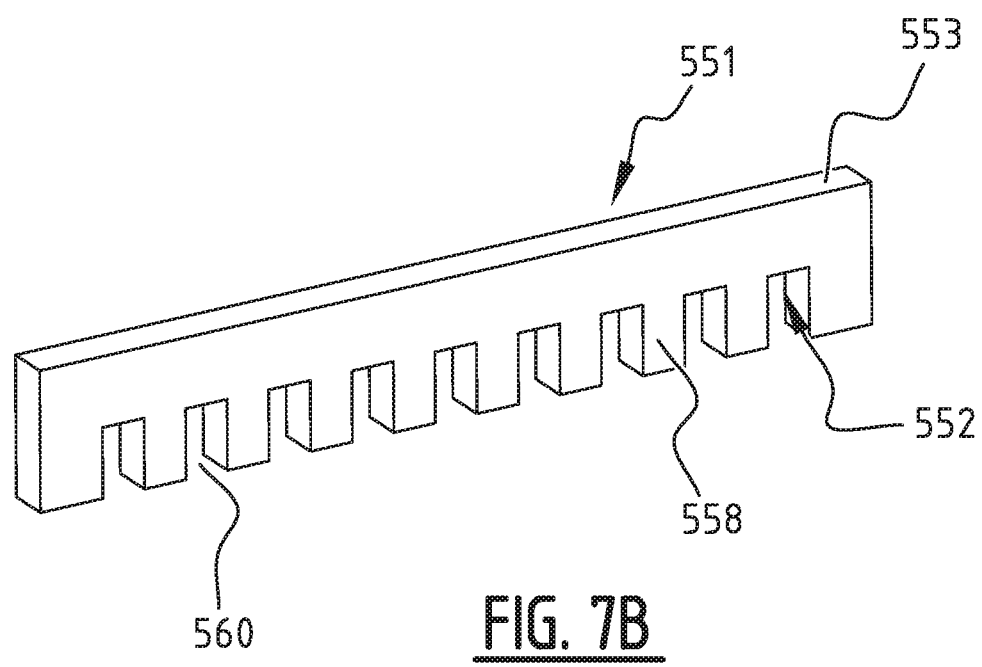
FIG. 7B shows a detailed view of the membrane stack of FIG. 7A.
Figure 8A:
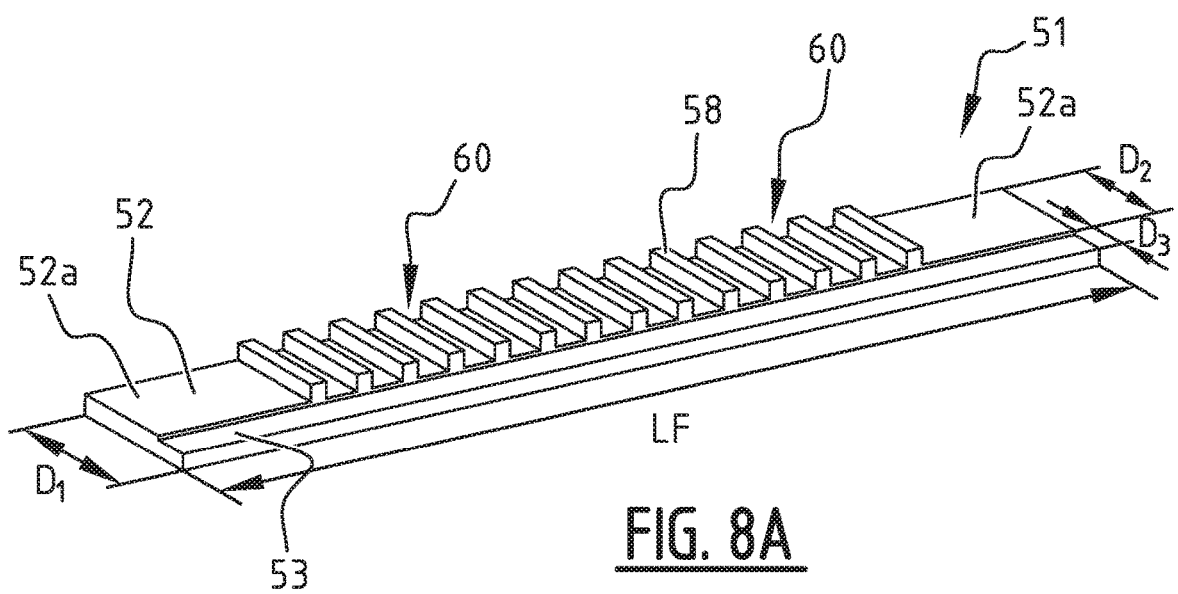
FIG. 8A shows a perspective view of a flow guide of FIG. 6.
Figure 8B:
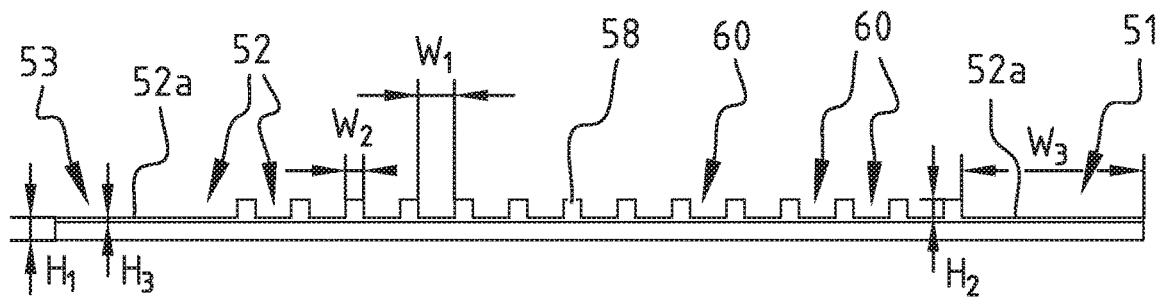
FIG. 8B shows a side view of a flow guide of FIG. 6.

In a second example of membrane stack 522, membrane stack 522 comprises flow guides 551, having flow section 552 and membrane support section 553 (see FIGS. 7A, 7B). Membranes 554, 556 are both connected to membrane support section 553 of flow guide 551, whereas two different membranes are connected to a lower side of flow guide 551 near flow section 552. Flow section 552 extends between projections 558 that form channels from flow openings 560, 560*a*, 560*b* towards membrane cell 524.

Figure 9:
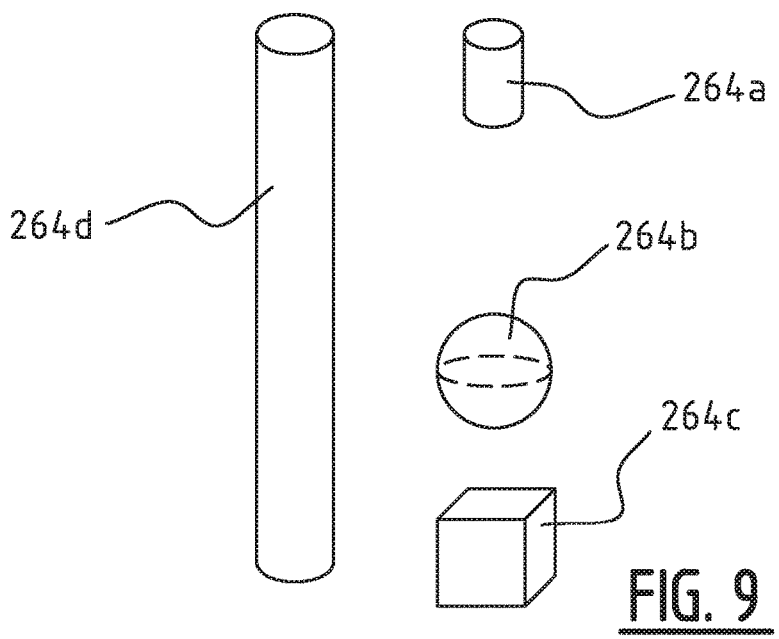
FIG. 9 shows schematic examples of flow distributor elements according to the invention.

Flow distributor elements 264 can be provided in different forms, shapes and/or sizes. Examples of shapes of flow distributor elements 264 are provided in FIG. 9. It is noted that a length of elongated cylindrical element 264*d* can be much larger than a diameter of elongated cylindrical element 264*d*.

In use of the assembly, a fluid flow is provided through opening 18 of end plate 12 into flow compartments 46, 48; 146, 148; 246, 24; 346, 348, which thus form feed flow compartments 46, 48; 146, 148; 246, 24; 346, 348. From feed flow compartments 46, 48; 146, 148; 246, 24; 346, 348 the fluid is divided over flow channels/openings 60*b*, 60*c* (not shown) by side plates 26, 28, 30, 32; 126, 128, 130, 132; 226, 228, 230, 232 and/or porous layers 126*b*, 128*b*, 130*b*, 132*b*; 326*b*, 328*b*, 330*b*, 332*b* and/or flow distributor elements 264 into membrane cells 24, which are stacked in a cross-flow configuration in this example. In membrane cells 24, a process, such as an ED or RED-process takes place, and the fluid flow exits membrane cells 24 through respective openings 60*a*, 60*d* (not shown) into flow compartments 42, 44; 142, 144; 242, 244; 342, 344. In this example, the fluid flows exit compartments 42, 44; 142, 144; 242, 244; 342, 344 through flow openings 20, 120, 220, 320 (not shown) in end plate 12, 112, 212, 312 (not shown).

It is noted that the fluid flow through compartments 242, 244, 246, 248 is divided more evenly by means of flow distributor elements 264, which is this example are provided as spherical plastic beads 264. It is noted that porous layers 126*b*, 128*b*, 130*b*, 132*b*; 326*b*, 328*b*, 330*b*, 332*b* may be used separately or in conjunction with flow distributor particles 264 (see for example FIG. 4). It is furthermore noted that both the porous layer 126*b*, 128*b*, 130*b*, 132*b*; 326*b*, 328*b*, 330*b*, 332*b* and/or the flow distributor particles 264 may also be used in known, existing stack assemblies and its use whether alone or in combination is therewith not restricted to the stack assembly according to the invention.

It is noted that the size and form of each of the flow openings 50 and/or the flow openings 60*a*-60*d* (not shown) are preferably chosen to complement each other to achieve a evenly divided fluid flow over membrane cells 24. Additionally, scalings may be applied between side plates 26, 28, 30, 32 and sides 22*a*, 22*b*, 22*c*, 22*d* of membrane stack 22.

The present invention is by no means limited to the above described preferred embodiments thereof. The rights sought are defined by the following claims, within the scope of which many modifications can be envisaged.

The invention claimed is:

1. Stack assembly comprising:
   a hollow external cylindrical housing having a central axis, the external housing extending from a first end to a second end and enclosing a housing space;
   a membrane stack comprising a plurality of membranes, wherein the membrane stack is positionable inside the external housing;
   a number of side plates extending along the membrane stack, wherein each side plate of the number of side plates is associated with a side of the membrane stack and extends along the associated side; and
   a number of sealing connectors that extend along a longitudinal length of the external housing and adjacent with an inner surface of the external housing, wherein each sealing connector of the number of sealing connectors is configured to connect two side plates to each other,
   wherein the housing space between each of the number of side plates and the external housing defines a respective flow compartment,
   wherein the sealing connectors and the side plates cooperate to form an enclosing structure, and wherein, in use of the stack assembly, the enclosing structure encloses the membrane stack, and
   wherein each of the number of side plates comprises an opening in communication with a respective flow compartment and wherein each of the number of side plates comprise at least one flow channel defined therein that is configured to regulate a flow of fluid from the flow compartments to and/or from the membrane stack.

2. Stack assembly according to claim 1, wherein the enclosing structure is connected to the membrane stack for forming a unit, and wherein the enclosing structure is removably positioned in the housing space.

3. Stack assembly according to claim 2, wherein the enclosing structure is fixedly connected to the membrane stack, such that it forms an integral unit.

4. Stack assembly according to claim 2, wherein the enclosing structure is releasably connected to the membrane stack.

5. Stack assembly according to claim 1, wherein each flow compartment is delineated by a side of the enclosing structure and an associated part of the inner surface of the external housing that extends from a first sealing connector of the side of the enclosing structure to a second sealing connector of the side of the enclosing structure.

6. Stack assembly according to claim 1, additionally comprising a first end plate that is connectable to the first end of the external housing and a second end plate that is connectable to the second end of the external housing, wherein one or both end plates are provided with flow channels for providing a flow of fluid to and/or from the membrane stack.

7. Stack assembly according to claim 1, wherein at least one of the number of side plates comprises:
a frame having a central opening; and
a porous layer that is positioned on the frame, wherein the porous layer comprises the at least one flow channel that is configured for guiding a fluid flow to and/or from the membrane stack.

8. Stack assembly according to claim 7, wherein the length and the width of the porous layer are such that it extends over substantially the entire length and width of the membrane stack side to which it is associated.

9. Stack assembly according to claim 7, wherein the porous layer has a porosity in the range of 1%-90%.

10. Stack assembly according to claim 7, wherein the thickness and/or porosity of the porous layer is chosen such that a pressure gradient across the porous layer is in the range of 0.1-100 mbar and/or wherein a thickness of the layer is in the range of 0.01 mm-100 mm.

11. Stack assembly according to claim 7, wherein the layer is a porous foil or a porous netting.

12. Method for generating energy and/or performing an electrodialysis process, the method comprising the steps of:
providing a stack assembly according to claim 1;
providing a fluid flow to the stack assembly; and
generating energy from the fluid flow or performing an electrodialysis process.

13. Stack assembly according to claim 1, wherein the external housing is a pressure vessel.

14. Method for assembling a stack assembly, the method comprising the steps of:
providing:
a hollow external cylindrical housing having a central axis and an inner space, the housing extending from a first to a second end;
a membrane stack comprising a plurality of membranes;
a number of side plates;
a number of sealing connectors; and
end plates configured for closing the first and second ends,
wherein the housing space between each of the number of side plates and the external housing defines a respective flow compartment,
wherein the number of side plates comprises an opening in communication with a respective flow compartment and wherein each of the number of side plates comprise at least one flow channel defined therein that is configured to regulate a flow of fluid from the flow compartments to and/or from the membrane stack;
connecting side edges of the side plates with each other using the sealing connectors to form an enclosing structure configured for enclosing the membrane stack;
positioning the membrane stack in the enclosing structure;
sliding the enclosing structure with the enclosed membrane stack through the first or second end into the inner space of the external housing; and
closing the first and second opening with the end plates.

15. Method according to claim 14, wherein the step of positioning the membrane stack in the enclosing structure is performed during forming of the enclosing structure in that in a first step a side plate is positioned against each side wall of the membrane stack, and subsequently the step of connecting side edges of the side plates with each other using the sealing connectors is performed.

16. Stack assembly comprising:
a hollow external cylindrical housing having a central axis, the external housing extending from a first end to a second end and enclosing a housing space;
a membrane stack comprising a plurality of membranes, wherein the membrane stack is positionable inside the external housing;
a number of side plates extending along the membrane stack, wherein each side plate of the number of side plates is associated with a side of the membrane stack and extends along the associated side; and
a number of sealing connectors that extend along a longitudinal length of the external housing and adjacent with an inner surface of the external housing, wherein each sealing connector of the number of sealing connectors is configured to connect two side plates to each other,
wherein the housing space between each of the number of side plates and the external housing defines a respective flow compartment,
wherein the sealing connectors and the side plates cooperate to form an enclosing structure, and wherein, in use of the stack assembly, the enclosing structure encloses the membrane stack, and
wherein each flow compartment comprises a plurality of flow distributor elements and wherein the number of side plates are provided with flow openings that in combination with the flow distributor elements are configured to regulate a flow of fluid from a flow compartment to and/or from the membrane stack.

* * * * *